United States Patent
Shibutani et al.

(10) Patent No.: US 8,731,188 B2
(45) Date of Patent: *May 20, 2014

(54) CRYPTOGRAPHIC PROCESSING APPARATUS AND CRYPTOGRAPHIC PROCESSING METHOD, AND COMPUTER PROGRAM

(75) Inventors: Kyoji Shibutani, Kanagawa (JP); Taizo Shirai, Kanagawa (JP); Toru Akishita, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 13/436,223

(22) Filed: Mar. 30, 2012

(65) Prior Publication Data

US 2012/0191986 A1    Jul. 26, 2012

Related U.S. Application Data

(63) Continuation of application No. 12/439,543, filed as application No. PCT/JP2007/066729 on Aug. 29, 2007, now Pat. No. 8,165,288.

(30) Foreign Application Priority Data

Sep. 1, 2006 (JP) .................................. 2006-238223

(51) Int. Cl.
H04K 1/00 (2006.01)
(52) U.S. Cl.
USPC ............................................. 380/28; 380/29
(58) Field of Classification Search
None
See application file for complete search history.

(56) References Cited

U.S. PATENT DOCUMENTS

| | | | |
|---|---|---|---|
| 5,003,597 | A | 3/1991 | Merkle |
| 6,185,679 | B1 | 2/2001 | Coppersmith et al. |
| 6,769,063 | B1 | 7/2004 | Kanda et al. |
| 7,450,720 | B2 | 11/2008 | Roelse |

FOREIGN PATENT DOCUMENTS

| | | |
|---|---|---|
| JP | 2005-107078 | 4/2005 |
| WO | WO 99/66669 | 12/1999 |

OTHER PUBLICATIONS

Sony, "The 128-bit Blockcipher CLEFIA: Design Rationale," Sony Corporation, Jun. 1, 2007, 19 pages, Retrieved Aug. 5, 2013, Online: http://www.sony.net/Products/cryptography/clefia/download/data/clefia-design-1.0.pdf.*

Okamoto, Introduction to Cryptographic Theory, Kyoritsu Shuppan Co., Ltd., Feb. 25, 1993, pp. 33-38.

(Continued)

*Primary Examiner* — Nadia Khoshnoodi
*Assistant Examiner* — Robert Leung
(74) *Attorney, Agent, or Firm* — Finnegan, Henderson, Farabow, Garrett & Dunner, LLP

(57) ABSTRACT

In extended Feistel type common key block cipher processing, a configuration is realized in which an encryption function and a decryption function are commonly used. In a cryptographic processing configuration to which an extended Feistel structure in which the number of data lines d is set to an integer satisfying d≥3 is applied, involution properties, that is, the application of a common function to encryption processing and decryption processing, can be achieved. With a configuration in which round keys are permuted or F-functions are permuted in the decryption processing, processing using a common function can be performed by setting swap functions for the encryption processing and the decryption processing to have the same processing style.

20 Claims, 19 Drawing Sheets

(56) References Cited

OTHER PUBLICATIONS

Office Action mailed Dec. 20, 2011, for Japanese Patent Application No. 2006-238223.
Burwick et al., "Mars—A Candidate Cipher for AES", Sep. 22, 2009, available at http://www.research.ibm.com/secuirty/mars.pdf.
Shirai et al. "On Feistel Ciphers Using Optimal Diffusion Mappings Across Multiple Rounds", Parallel and Distributed Processing and Applications: Second International Symposium, ISPA 2004 Proceedings, Dec. 13-15, 2004.
Jemezes et al., "Handbook of Applied Cryptography, Passage", Handbook of Applied Cryptography, CRC Press, FL, Jan. 1, 1997.
Nyberg, "Generalized Feistel Networks", Finnish Defence Forces, CIS Division, Helsinki, Finland, pp. 91-104, 1996.
Zheng et al., "On the Construction of Block Ciphers Provably Secure and Not Relynig on Any Unproved Hypotheses", Division of Electrical and Computer Engineering, Yokohama National University, Yokohama, Japan, pp. 461-480, 1990.

* cited by examiner (a)

(b)

CRYPTOGRAPHIC PROCESSING APPARATUS AND CRYPTOGRAPHIC PROCESSING METHOD, AND COMPUTER PROGRAM

CROSS-REFERENCE TO RELATED APPLICATIONS

This application claims is a continuation of and claims the benefit of priority to U.S. patent application Ser. No. 12/439,543, filed Sep. 1, 2009 now U.S. Pat. No. 8,165,288, which is a U.S. national phase entry of International Patent Application No. PCT/JP2007/066729, filed Aug. 29, 2007, which claims priority to Japanese Patent Application No. JP 2006-238223, filed Sep. 1, 2006. The contents of the above-referenced applications are expressly incorporated herein by reference in their entireties.

TECHNICAL FIELD

The present invention relates to a cryptographic processing apparatus and cryptographic processing method, and a computer program. More specifically, the present invention relates to a cryptographic processing apparatus and cryptographic processing method which execute Feistel type common key block cipher processing, and a computer program.

BACKGROUND ART

Nowadays, with the development of network communication and electronic commerce, security ensuring in communication has become an important issue. One method for ensuring security is cryptographic technology, and communication using various encryption techniques is currently done in actuality.

For example, a system has been put into practical use in which a cryptographic processing module is embedded in a compact device such as an IC card to perform data transmission and reception between the IC card and a reader/writer serving as a data reading and writing apparatus to perform authentication processing or encryption and decryption of transmission and reception data.

There are various cryptographic processing algorithms, which are broadly classified into a public key cryptographic scheme in which an encryption key and a decryption key are set as different keys, for example, a public key and a private key, and a common key cryptographic scheme in which an encryption key and a decryption key are set as a common key.

The common key cryptographic scheme has various algorithms, one of which is a scheme in which a plurality of keys are generated based on a common key and data transformation processing in units of a block (such as 64-bit or 128-bit) is repeatedly executed using the plurality of generated keys. A typical algorithm with the application of such a key generation scheme and data transformation processing is a common key block cipher scheme.

As typical algorithms for common key block ciphers, for example, the DES (Data Encryption Standard) algorithm, which was formerly the U.S. standard cryptography, the AES (Advanced Encryption Standard) algorithm, which is the current U.S. standard cryptography, etc., have been known.

Such algorithms for common key block ciphers are mainly constituted by round function sections having F-function sections that repeatedly execute the transformation of input data, and a key scheduling section that generates round keys to be applied in the F-function sections in respective rounds of the round function sections. The key scheduling section first increases the number of bits to generate an expanded key on the basis of a master key (main key), which is a private key, and generates, on the basis of the generated expanded key, round keys (sub-keys) to be applied in the F-function sections in the respective rounds of the round function sections.

A known specific structure that executes an algorithm to which such round functions (F functions) are applied is a Feistel structure. The Feistel structure has a structure that transforms plaintext into ciphertext by using simple repetition of round functions (F-functions) serving as data transformation functions. Examples of documents describing cryptographic processing with the application of the Feistel structure include Non-Patent Documents 1 and 2.

However, problems of common key block cipher processing to which the Feistel structure is applied involve leakage of keys due to cryptanalysis. Typical known techniques of cryptanalysis or attack techniques include differential analysis (also called differential cryptanalysis or differential attack) in which multiple pieces of input data (plaintext) having certain differences therebetween and output data (ciphertext) thereof are analyzed to analyze applied keys in respective round functions, and linear analysis (also called linear cryptanalysis or linear attack) in which analysis based on plaintext and corresponding ciphertext is performed.

Easy analysis of keys due to cryptanalysis implies low security of the cryptographic processing therefor. In cryptographic algorithms of the related art, since processes (transformation matrices) applied in linear transformation sections of round function (F-function) sections are equal to each other in rounds of respective stages, analysis is feasible, resulting in easy analysis of keys.

As a configuration to address such a problem, a configuration in which two or more different matrices are arranged in linear transformation sections of round function (F-function) sections in a Feistel structure so that the matrices are switched every round has been proposed. This technology is called a diffusion-matrix switching mechanism (DSM: Diffusion Switching Mechanism, hereinafter referred to as DSM). This DSM enables enhancement of resistance to differential attacks or linear attacks.

FIG. 1 shows an example of a cryptographic processing configuration in which, instead of applying a diffusion-matrix switching mechanism (DSM), a Feistel structure of the related art in which only one type of matrix is arranged in linear transformation sections of round function (F-function) sections in a Feistel structure is applied. In the Feistel structure shown in FIG. 1, the number of rounds is set to r (for example, r=16), and F-functions in the respective rounds are indicated by F. The input is plaintext P. The plaintext P is divided into two data lines P[0] and P[1] (the number of divisions=2), and data transformation with the application of the F-functions is sequentially executed in the respective rounds to output C[0] and C[1], which constitute ciphertext C, as results of the transformation for the r rounds. In the F-functions for the respective rounds, round keys (sub-keys) serving as elements constituting an expanded key generated on the basis of a master key (main key) supplied from a key scheduling section, which is not shown in the figure, are input and applied for data transformation.

In the configuration shown in FIG. 1, the n-bit plaintext P is processed r times (r stages) using F-functions to which round keys $RK_1, RK_2, \ldots, RK_r$ are input, and, as a result, the n-bit ciphertext C is obtained. Halves into which the plaintext P is divided are respectively represented by P[0] and P[1] (P=P[0]||P[1]). Note that X1||X2 denotes concatenation data of X1 and X2. Likewise, halves into which the ciphertext C is divided are also respectively called C[0] and C[1] (C=C[0]

‖C[1]). Note that the detailed configuration of the F-functions are described in detail in the section of the explanation of the present invention.

In this manner, in a configuration in which respective rounds have F-functions of the same form to which a common linear transformation matrix is applied, in a case where decryption processing of returning ciphertext into plaintext is performed, as shown in FIG. 2, a Feistel structure having completely the same configuration is applied, and it is only required to set the order of round keys applied in respective rounds to be opposite to that in the case of the encryption processing. That is, it is possible to apply completely the same function to both an encryption function and a decryption function. In this manner, if it is possible to apply the same function to encryption processing and decryption processing, in view of implementation, a single configuration can be shared between encryption processing and decryption processing in hardware or software. Thus, size reduction and cost reduction of an apparatus are achieved. Note that in a case where it is possible to apply a common function to an encryption function and a decryption function, a corresponding cipher is defined to have involution properties.

This means that when an encryption function E that encrypts plaintext P using round keys $RK_1, RK_2, \ldots, RK_r$ is represented by $E(P, RK_1, RK_2, \ldots, RK_r)$, and a decryption function D that decrypts ciphertext C using round keys $RK_1, RK_2, \ldots, RK_r$ is represented by $D(C, RK_1, RK_2, \ldots, RK_r)$, the following representations are given:

(encryption function)

$C = E(P, RK_1, RK_2, \ldots, RK_r)$ (decryption function)

$P = D(C, RK_1, RK_2, \ldots, RK_r)$
$= E(C, RK_r, RK_{r-1}, \ldots, RK_1)$

It is found from above that the decryption function D is equivalent to the encryption function E, where the order of the round keys is permuted.

FIG. 3 shows an example of a Feistel structure including a diffusion-matrix switching mechanism (DSM) in which two or more different matrices are arranged in linear transformation sections of round function (F-function) sections in the Feistel structure so that the matrices are switched every round. The Feistel structure shown in FIG. 3 is configured such that, as in that of FIG. 1, the number of rounds is set to r (for example, r=16).

In the present example configuration, the F-functions in the respective rounds are configured such that a diffusion-matrix switching mechanism (DSM) configured to arrange two different F-functions $F_0$ and $F_1$ according to a certain rule is applied to improve resistance to differential attacks or linear attacks. That is, the F-functions $F_0$ and $F_1$ are configured to execute data transformation to which different linear transformation matrices are applied.

The input is plaintext P. The plaintext P is divided into two data lines P[0] and P[1] (the number of divisions=2), and data transformation with the application of the F-functions is sequentially executed in the respective rounds to output C[0] and C[1], which constitute ciphertext C, as results of the transformation for the r rounds. In the F-functions $F_0$ and $F_1$ for each round, round keys (sub-keys) serving as elements constituting an expanded key generated on the basis of a master key (main key) supplied from a key scheduling section, which is not shown in the figure, are input and applied to data transformation.

In a Feistel structure with the application of such a diffusion-matrix switching mechanism (DSM), in a case where decryption processing for returning ciphertext into plaintext is performed, as shown in FIG. 4, it is possible to perform the decryption processing by, without modifying the arrangement of the F-functions $F_0$ and $F_1$ for the respective rounds, using a Feistel structure to which a DSM having the same configuration as that of FIG. 3 is applied and setting the order of round keys applied to the respective rounds to be opposite to that of the encryption processing. That is, involution properties that enable a common function to be applied to an encryption function and a decryption function are also held in a Feistel structure to which a diffusion-matrix switching mechanism (DSM) is applied.

In a Feistel structure having the diffusion-matrix switching mechanism (DSM) explained with reference to FIGS. 3 and 4, plaintext P as the input is divided into two data lines P[0] and P[1], which are then input to round function sections to generate ciphertext. Alternatively, a configuration is provided in which ciphertext C is divided into two data lines C[0] and C[1], which are then input to round function sections to generate decrypted text. The number of data divisions is called the number of data lines or the number of divisions. A Feistel structure having the diffusion-matrix switching mechanism (DSM) shown in FIGS. 3 and 4 has a structure with the number of data lines (the number of divisions)=2. In the case of such a structure with the number of data lines (the number of divisions)=2, by suitably arranging F-functions, a configuration that allows the involution properties to be held can be built.

Unlike such a Feistel structure having only two data lines, on the other hand, an extended Feistel structure (GFN: Generalized Feistel Network) in which an arbitrary number of data lines greater than or equal to 3, for example, 3, 4, 5 . . . etc., are allowed exists. That is, a configuration exists in which the number of data lines on the input is not limited to two and three or more data lines are commonly used.

In an extended Feistel structure (GFN), a configuration in which, for example, plaintext P is divided into three data lines P[0], P[1], and P[2], which are then input to round function sections, or is divided into four data lines P[0], P[1], P[2], and P[3], which are then input to round function sections, or the like is allowed. Such a Feistel structure with an arbitrary number of data lines (the number of divisions) greater than or equal to 3 is called an extended Feistel structure (GFN: Generalized Feistel Network).

In such an extended Feistel structure (GFN) having an arbitrary number of data lines greater than or equal to 3, it is difficult to provide a configuration that holds the involution properties described above, that is, involution properties that allow a common function to be applied to an encryption function and a decryption function. In an extended Feistel structure (GFN), furthermore, it is further difficult to provide a configuration that holds involution properties in a configuration to which the diffusion-matrix switching mechanism (DSM) described above is applied, that is, a DSN-applied configuration having a configuration in which transformation processes in F-functions for respective rounds are not uniform.

Non-Patent Document 1: K. Nyberg, "Generalized Feistel networks", ASIACRYPT '96, SpringerVerlag, 1996, pp. 91-104.

Non-Patent Document 2: EYuliang Zheng, Tsutomu Matsumoto, Hideki Imai: On the Construction of Block Ciphers Provably Secure and Not Relying on Any Unproved Hypotheses. CRYPTO 1989: 461-480

DISCLOSURE OF INVENTION

Technical Problem

The present invention has been made in view of the foregoing problems, and aims to provide a cryptographic processing apparatus and cryptographic processing method, and a computer program which ensure common key block cipher processing having not only a Feistel structure having two data lines but also an extended Feistel structure (GFN: Generalized Feistel Network) having an arbitrary number of data lines greater than or equal to 3, such as 3 or 4, in which involution properties, that is, the application of a common function to encryption processing and decryption processing, can be achieved.

The present invention further aims to provide a cryptographic processing apparatus and cryptographic processing method, and a computer program which ensure common key block cipher processing to which a diffusion-matrix switching mechanism (DSM) configured to arrange three or more different matrices in round function sections on a round-by-round basis is applied and which has not only a Feistel structure having two data lines but also an extended Feistel structure (GFN) having arbitrary data lines greater than or equal to 3, such as 3 or 4, in which involution properties, that is, the application of a common function to encryption processing and decryption processing, can be achieved.

Technical Solution

A first aspect of the present invention resides in:

a cryptographic processing apparatus that executes cryptographic processing to which an extended Feistel structure in which the number of data lines d is set to an integer satisfying d≥3 is applied, characterized by including:

a data processing unit that executes data processing including a common swapping process which is common to encryption processing and decryption processing, wherein the data processing unit is configured to modify applied round keys in the encryption processing and the decryption processing to execute data processing including the common swapping process in both the encryption processing and the decryption processing.

Furthermore, in an embodiment of the cryptographic processing apparatus of the present invention, it is characterized in that the data processing unit is configured to execute a common function including a swap function which is common to the encryption processing and the decryption processing.

Furthermore, in an embodiment of the cryptographic processing apparatus of the present invention, it is characterized in that the data processing unit is configured to execute cryptographic processing in which transformation matrices of linear transformation processes executed in F-functions of respective rounds constituting the extended Feistel structure are set to a common matrix, and to perform a round key permutation process in which an applied sequence for round keys applied in respective rounds of the decryption processing is set to a sequence opposite to that of the cryptographic processing and in which round keys input to a plurality of F-functions for each of even-numbered rounds are set to have an input style different from an input style in the encryption processing.

Furthermore, in an embodiment of the cryptographic processing apparatus of the present invention, it is characterized in that the data processing unit is configured to execute cryptographic processing in accordance with a Feistel structure having a diffusion-matrix switching mechanism (DSM: Diffusion Switching Mechanism) in which transformation matrices applied to linear transformation processes in F-functions for respective rounds constituting the extended Feistel structure are configured by selectively applying at least two or more different matrices, and to perform an F-function and round key permutation process in which an applied sequence for round keys applied in respective rounds of the decryption processing is set to a sequence opposite to that of the cryptographic processing and in which a plurality of F-functions in each of even-numbered rounds and round keys input to the plurality of F-functions are set to have an input style different from an input style in the encryption processing.

Furthermore, in an embodiment of the cryptographic processing apparatus of the present invention, it is characterized in that the data processing unit is configured to execute a process of invoking a table storing input/output correspondence data corresponding to each of a plurality of different F-functions from a memory in accordance with an address designated in correspondence with each round to calculate processing results of the respective F-functions.

Furthermore, in an embodiment of the cryptographic processing apparatus of the present invention, it is characterized in that the data processing unit is configured to, in a case where the number of rounds constituting the extended Feistel structure is an even number, execute output adjustment to perform a sequence permutation process on output results on a final round of the decryption processing.

Furthermore, a second aspect of the present invention resides in:

a cryptographic processing method that executes, in a cryptographic processing apparatus, cryptographic processing to which an extended Feistel structure in which the number of data lines d is set to an integer satisfying d≥3 is applied, characterized by including:

a data processing step of, in a data processing unit, executing data processing including a common swapping process which is common to encryption processing and decryption processing, wherein the data processing step modifies applied round keys in the encryption processing and the decryption processing to execute data processing including the common swapping process in both the encryption processing and the decryption processing.

Furthermore, in an embodiment of the cryptographic processing method of the present invention, it is characterized in that the data processing step is the step of executing a common function including a swap function which is common to the encryption processing and the decryption processing.

Furthermore, in an embodiment of the cryptographic processing method of the present invention, it is characterized in that the data processing step is the step of executing cryptographic processing in which transformation matrices of linear transformation processes executed in F-functions of respective rounds constituting the extended Feistel structure are set to a common matrix, wherein a round key permutation process in which an applied sequence for round keys applied in respective rounds of the decryption processing is set to a sequence opposite to that of the cryptographic processing and in which round keys input to a plurality of F-functions for each of even-numbered rounds are set to have an input style different from an input style in the encryption processing is performed.

Furthermore, in an embodiment of the cryptographic processing method of the present invention, it is characterized in that the data processing step is the step of executing cryptographic processing in accordance with a Feistel structure having a diffusion-matrix switching mechanism (DSM: Diffusion Switching Mechanism) in which transformation matrices applied to linear transformation processes in F-functions for respective rounds constituting the extended Feistel structure are configured by selectively applying at least two or more different matrices, wherein an F-function and round key permutation process in which an applied sequence for round keys applied in respective rounds of the decryption processing is set to a sequence opposite to that of the cryptographic processing and in which a plurality of F-functions in each of even-numbered rounds and round keys input to the plurality of F-functions are set to have an input style different from an input style in the encryption processing is performed.

Furthermore, in an embodiment of the cryptographic processing method of the present invention, it is characterized in that the data processing step includes the step of executing a process of invoking a table storing input/output correspondence data corresponding to each of a plurality of different F-functions from a memory in accordance with an address designated in correspondence with each round to calculate processing results of the respective F-functions.

Furthermore, in an embodiment of the cryptographic processing method of the present invention, it is characterized in that the data processing step includes the step of in a case where the number of rounds constituting the extended Feistel structure is an even number, executing output adjustment to perform a sequence permutation process on output results on a final round of the decryption processing.

Furthermore, a third aspect of the present invention resides in:

a computer program that causes cryptographic processing to which an extended Feistel structure in which the number of data lines d is set to an integer satisfying d≥3 is applied to be executed in a cryptographic processing apparatus, characterized by including:

a data processing step of causing data processing including a common swapping process which is common to encryption processing and decryption processing to be executed in a data processing unit, wherein the data processing step is the step of:

causing data processing including the common swapping process in both the encryption processing and the decryption processing to be executed by modifying applied round keys in the encryption processing and the decryption processing.

Note that a computer program of the present invention is, for example, a computer program that can be provided through a storage medium or a communication medium through which the program is provided in a computer-readable format to a computer system capable of executing various program code, for example, a recording medium such as a CD, an FD, or an MO, or a communication medium such as a network. By providing such a program in a computer-readable format, processing in accordance with the program is realized on a computer system.

Further objects, features, and advantages of the present invention will become more apparent from the more detailed-description based on an exemplary embodiment of the present invention, which will be described below, or the accompanying drawings. Note that as used in the description the term system refers to a configuration of a logical set of a plurality of apparatuses, and is not limited to one whose constituent apparatuses are housed in a single housing.

Advantageous Effects

According to a configuration of an exemplary embodiment of the present invention, a cryptographic processing configuration to which an extended Feistel structure in which the number of data lines d is set to an integer satisfying d≥3 is applied can be configured such that involution properties, that is, the application of a function which is common to encryption processing and decryption processing, can be achieved. Specifically, with a configuration that provides permutation of round keys or permutation of F-functions in decryption processing, processing using a common function can be performed by setting swap functions for encryption processing and decryption processing to have the same processing style.

BEST MODE FOR CARRYING OUT THE INVENTION

The details of a cryptographic processing apparatus and cryptographic processing method, and a computer program of the present invention will be explained hereinafter. The description will be made in accordance with the following items:

1. Feistel Structure Having SP Type F-Functions
2. Method of Setting Diffusion-matrix Switching Mechanism (DSM) for Feistel Structure Having Two Data Lines
3. With Regard to Extended Feistel Structure (GFN: Generalized Feistel Network)
   (3-1) With Regard to Extended Feistel Structure (GFN) Having No Diffusion-matrix Switching Mechanism (DSM)
   (3-2) With Regard to Extended Feistel Structure (GFN) Having Diffusion-matrix Switching Mechanism (DSM)
4. With Regard to Involution Properties Holding Structure in Extended Feistel Structure (GFN)
   (4-1) With Regard to Involution Properties Holding Structure in Extended Feistel Structure (GFN) Having No Diffusion-matrix Switching Mechanism (DSM)
   (4-2) With Regard to Involution Properties Holding Structure in Extended Feistel Structure (GFN) Having Diffusion-matrix Switching Mechanism (DSM)
5. Example Configuration of Cryptographic Processing Apparatus

[1. Feistel Structure Having SP Type F-Functions]

First, a Feistel structure having SP type F-functions will be explained. A Feistel structure, which is known as a design of common key block ciphers, has a structure that transforms plaintext into ciphertext by using repetition of basic processing units called round functions.

Figure 5:
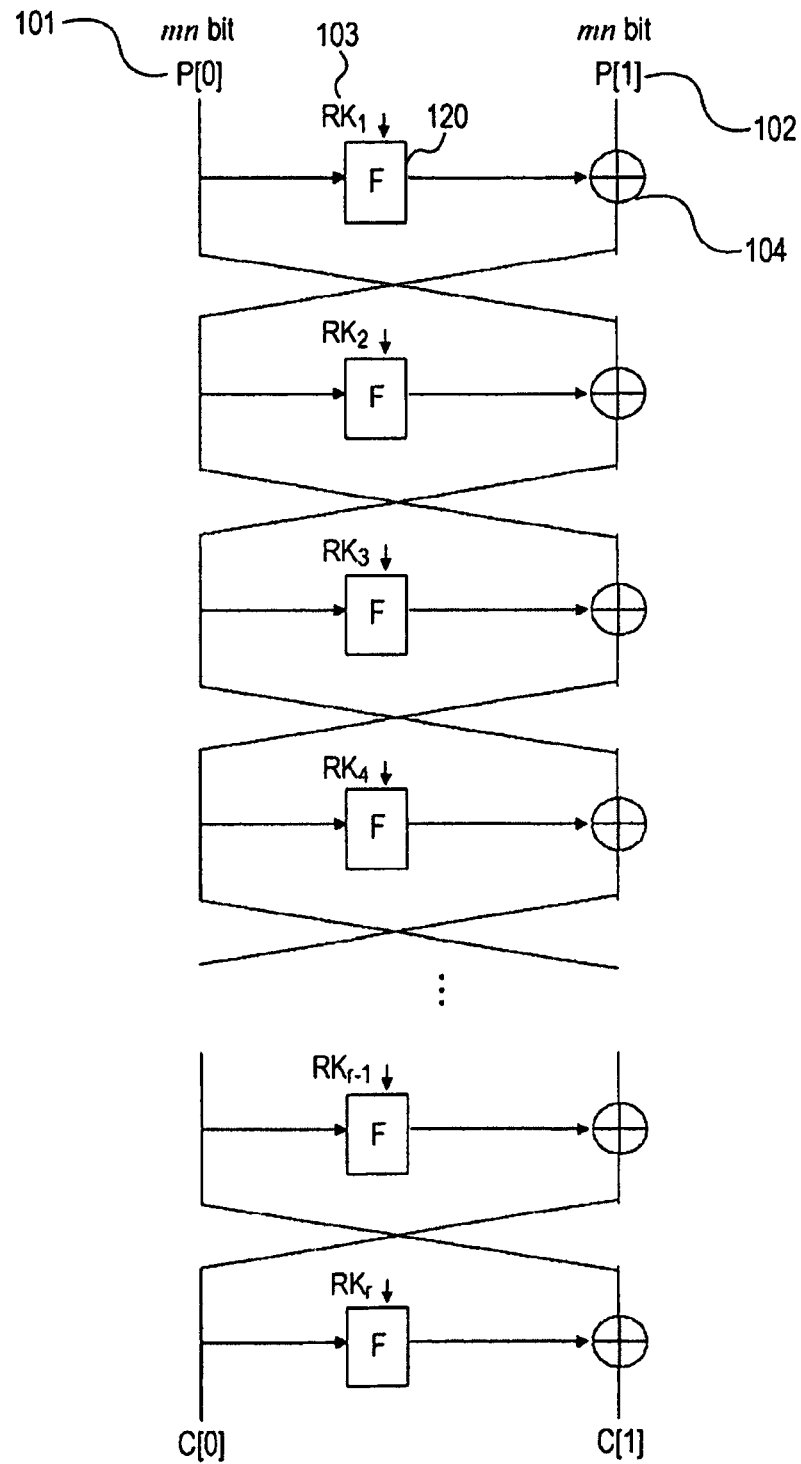
FIG. 5 is a diagram explaining a basic configuration of a Feistel structure.

A basic configuration of the Feistel structure will be explained with reference to FIG. 5. In FIG. 5, an example of a Feistel structure having two data lines having the number of rounds=r, namely, r rounds, is shown. Note that the number of rounds, r, is a parameter determined at the stage of design, and is a value that can be modified according to, for example, the length of an input key.

In the Feistel structure shown in FIG. 5, it is assumed that plaintext to be input as an encryption target has a length of 2 nm bits, where m and n are both integers. First, 2 nm-bit plaintext is divided into two mn-bit input data segments P[0] 101 and P[1] 102, which are set as input values. The example shown in the figure is configured such that an input value is divided into two parts, and is an example configuration in which the number of data lines (number of divisions)=2.

A Feistel structure is expressed by repetition of basic processing units called round functions, and data transformation functions included in respective rounds are called round functions (F-functions) 120. In the configuration of FIG. 5, an example configuration in which the round functions 120 are repeated for r stages is shown.

For example, in the first round, mn-bit input data X and an mn-bit round key $RK_1$ 103 input from a key scheduling section (key generating section), which is not shown in the figure, are input to the F-function 120, and mn-bit data Y is output after a data transformation process is performed in the round function (F-function) 120. The output is subjected to an exclusive-OR operation with input data from the other previous stage (in the case of the first stage, input data $P_L$) in an exclusive-OR section 104, and an mn-bit operation result is output to a next round function. By repeatedly applying this processing, namely, round functions (F-functions) corresponding to only the designated number of rounds (r), an encryption process is completed, and ciphertext data segments C[0] and C[1] are output. In a decryption process in a Feistel structure in which round functions (F-functions) executed in respective rounds have the same configuration, it is only required to reverse the order in which round keys are inserted, and there is no need to configure an inverse function.

A configuration of the round functions (F-functions) 120 set as functions for the respective rounds will be explained with reference to FIG. 6. FIG. 6(a) is a diagram showing an input and output to and from a round function (F-function) 120 for one round, and FIG. 6(b) is a diagram showing the details of the configuration of the round function (F-function) 120. As shown in FIG. 6(b), the round function (F-function) 120 has a so-called SP type configuration in which a non-linear transformation layer (S layer) and a linear transformation layer (P layer) are connected.

Figure 6:
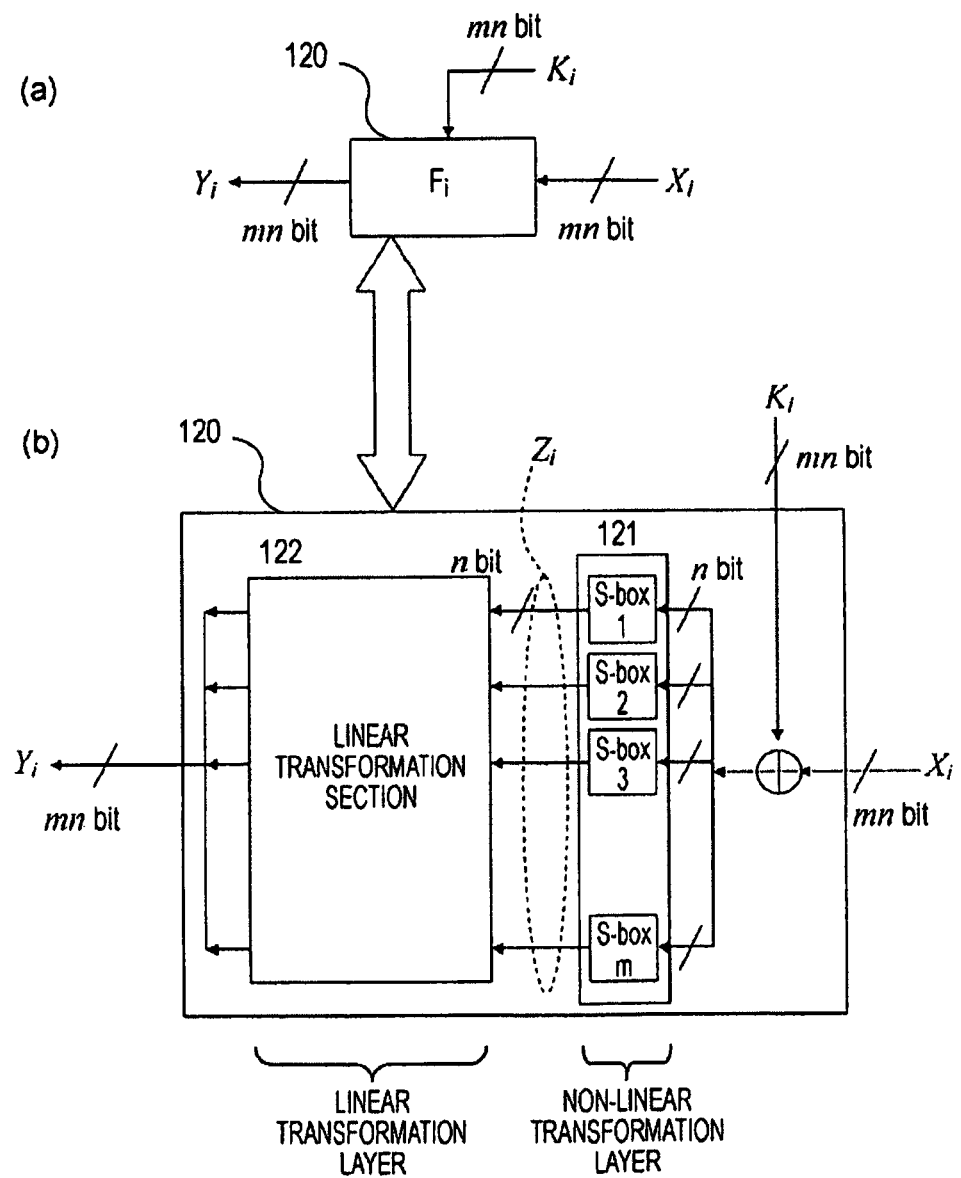
FIG. 6 is a diagram explaining a configuration of an F-function set as a round function section.

The round function (F-function) 120 shown in FIG. 6 is a function with an input/output bit length set to m×n (m, n: integer) bits. Within an SP type F-function, first, an exclusive-OR between key data $K_i$ and data $X_i$ is executed. Next, the non-linear transformation layer (S layer) is applied, and then the linear transformation layer (P layer) is applied.

Specifically, the non-linear transformation layer (S layer) is configured such that m non-linear transformation tables with n-bit input and n-bit output, called S-boxes 121, are arranged. Data of mn bits is divided into n-bit segments which are then input to the corresponding S-boxes 121 so that the data is transformed. In each S-box, for example, a non-linear transformation process to which a transformation table is applied is executed.

The linear transformation layer (P layer) is constituted by a linear transformation section 122. The linear transformation section 122 receives an input of an mn-bit output value Z, which is output data from the S-boxes 121, and applies linear transformation to the input to output an mn-bit result. The linear transformation section 122 executes a linear transformation process such as a process of permuting input bit positions, and outputs an mn-bit output value Y. The output value Y is exclusive-ORed with the input data from the previous stage, and is set as an input value of an F-function for the next round.

Note that in the configuration of the present exemplary embodiment explained hereinafter, linear transformation executed in the linear transformation section 122 serving as the linear transformation layer (P layer) is defined as linear transformation performed by applying an mn×mn matrix defined over GF(2), and it is assumed that a matrix included in the i-th round is called $M_i$. Note that it is assumed that S-boxes serving as non-linear transformation sections and linear transformation in the configuration explained in the present invention are bijective.

[2. Method of Setting Diffusion-Matrix Switching Mechanism (DSM) for Feistel Structure Having Two Data Lines]

As explained earlier, in cryptographic processing to which a Feistel structure is applied, a configuration to which a diffusion-matrix switching mechanism (DSM: Diffusion Switching Mechanism, hereinafter referred to as DSM) is applied has been proposed as a configuration for enhancing resistance to differential attacks or linear attacks. DSM is configured to, instead of setting matrices applied in linear transformation sections of round function (F-function) sections in the Feistel structure to be the same for all rounds, arrange at least two or more different matrices for each round. This DSM enables enhancement of resistance to differential attacks or linear attacks.

An overview of this DSM will be explained. In a Feistel structure, in a case where a diffusion-matrix switching mechanism (DSM) is applied, matrices to be applied in linear transformation sections (P layers) of round function (F-function) sections constituting the Feistel structure are a plurality of different matrices. For example, in the Feistel structure with r rounds, unlike that shown in FIG. 5, all matrices applied in the respective rounds are not set to be the same linear transformation matrix but at least two or more types of matrices are arranged according to a specific rule.

Figure 7:
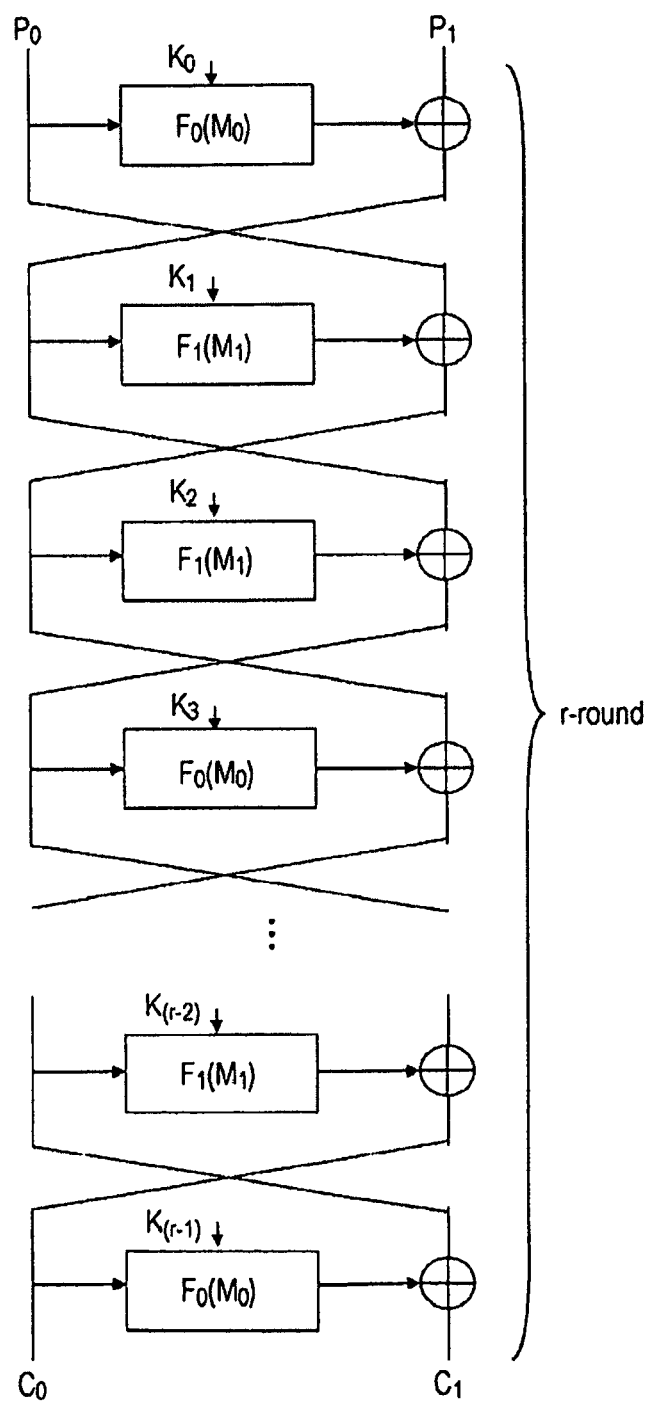
FIG. 7 is a diagram showing an example of a Feistel structure in which a diffusion-matrix switching mechanism (DSM) is realized.

For example, FIG. 7 shows an example of a Feistel structure in which a diffusion-matrix switching mechanism (DSM) in which two different linear transformation matrices $M_0$ and $M_1$ are arranged in linear transformation layers of F-functions on respective rounds is realized. In the example of the Feistel structure shown in FIG. 7, an F-function $F_0$ represents an F-function that executes a linear transformation process to which the linear transformation matrix $M_0$ is applied, and an F-function $F_1$ represents an F-function that executes a linear transformation process to which the linear transformation matrix $M_1$ is applied.

The two linear transformation matrices $M_0$ and $M_1$ are constituted by different matrices.

Note that in order to realize a diffusion-matrix switching mechanism (DSM), it is necessary that matrices to be applied meet predetermined conditions. One of the conditions is a restriction on the number of branches (Branch). This restriction will be explained hereinafter.

In the number of branches for each of the plurality of different matrices $M_0$ to $M_n$ applied to linear transformation in the round function sections in the Feistel structure, a minimum value of the number of branches within a matrix applied: $B_1^D$, and minimum values of the numbers of branches corresponding to combined matrices including a plurality of matrices to be applied: $B_2^D, B_3^D, B_2^L$ are defined as follows:

$$B_1^D = \min_i(Branch_n(M_i))$$ [Equation 1]

$$B_2^D = \min_i(Branch_n([M_i|M_{i+2}]))$$

$$B_3^D = \min_i(Branch_n([M_i | M_{i+2} | M_{i+4}]))$$

$$B_2^L = \min_i(Branch_n([{}^tM_i^{-1} |{}^t M_{i+2}^{-1}]))$$

In the above equation, $M_i$ denotes a linear transformation matrix to be applied to the linear transformation process for the i-th round in the Feistel structure, $[M_i|M_{i+2}| \ldots ]$ denotes a combined matrix obtained by concatenating the respective matrices, namely, $M_i|M_{i+2}| \ldots$, ${}^tM$ denotes a transposed matrix of the matrix M, and $M^{-1}$ denotes an inverse matrix of the matrix M.

In the above equation, specifically, $:B_2^D, B_3^D, B_2^L$ represents a minimum value of the number of branches of a combined matrix including matrices included in F-functions for two or three rounds which are consecutive every other round in the Feistel structure.

For example, it is known that the respective matrices are set so that the respective numbers of branches described above satisfy the following conditions:

$B_2^D \geq 3, B_3^D \geq 3,$ and $B_2^L \geq 3$, whereby the resistance to differential attacks or linear attacks can be enhanced in the Feistel structure.

Note that the subscripts and superscripts in $B_1^D, B_2^D, B_3^D$, and $B_2^L$ have the following meanings:

"n" of $B_n^D$ represents the number of matrices combined, "D" of $B_n^D$ represents a condition for resistance to differential attacks (Differential Attack), and "L" of $B_n^L$ represents a condition for resistance to linear attacks (Linear Attack).

Figure 1:
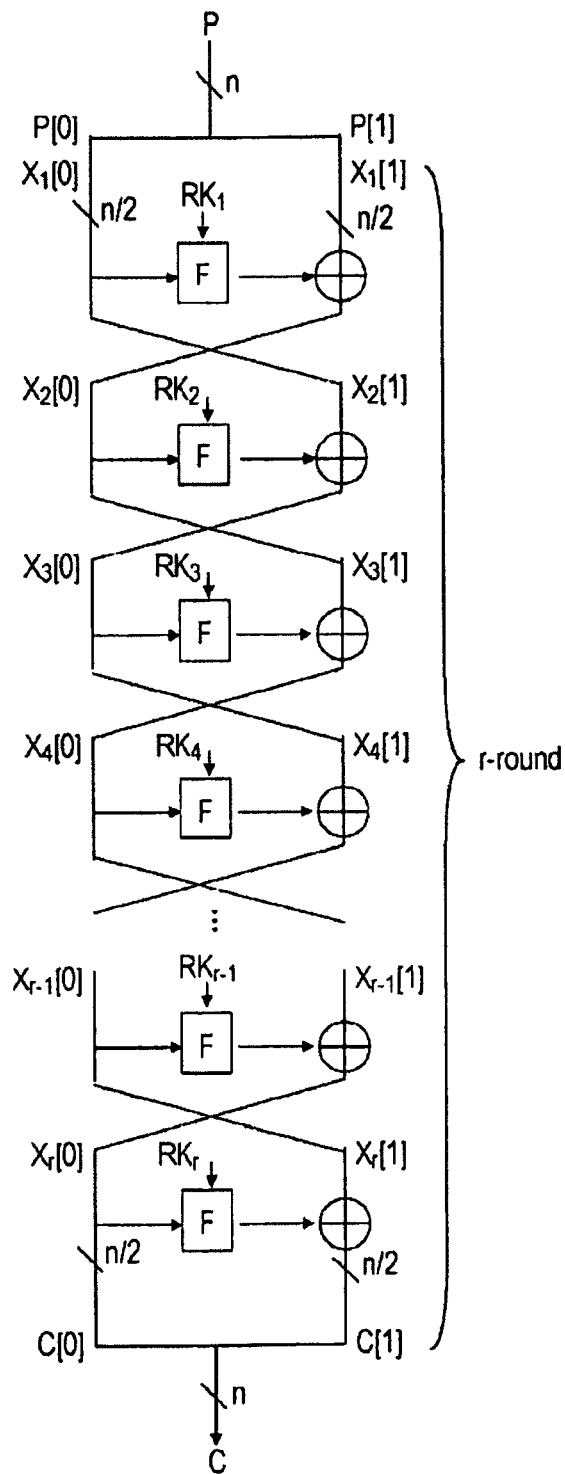
FIG. 1 is a diagram showing an example of a cryptographic processing configuration having a Feistel structure of the related art to which a diffusion-matrix switching mechanism (DSM) is not applied.
Figure 2:
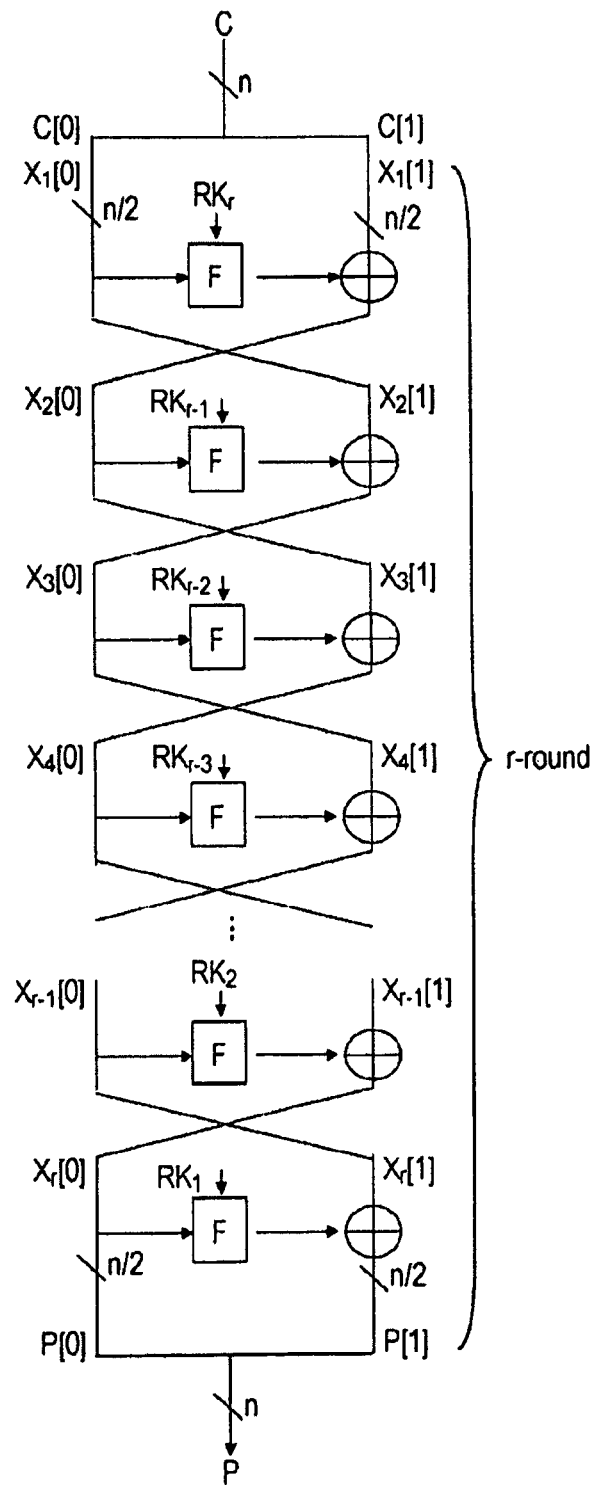
FIG. 2 is a diagram showing an example of a decryption processing configuration having a Feistel structure of the related art to which a diffusion-matrix switching mechanism (DSM) is not applied.
Figure 3:
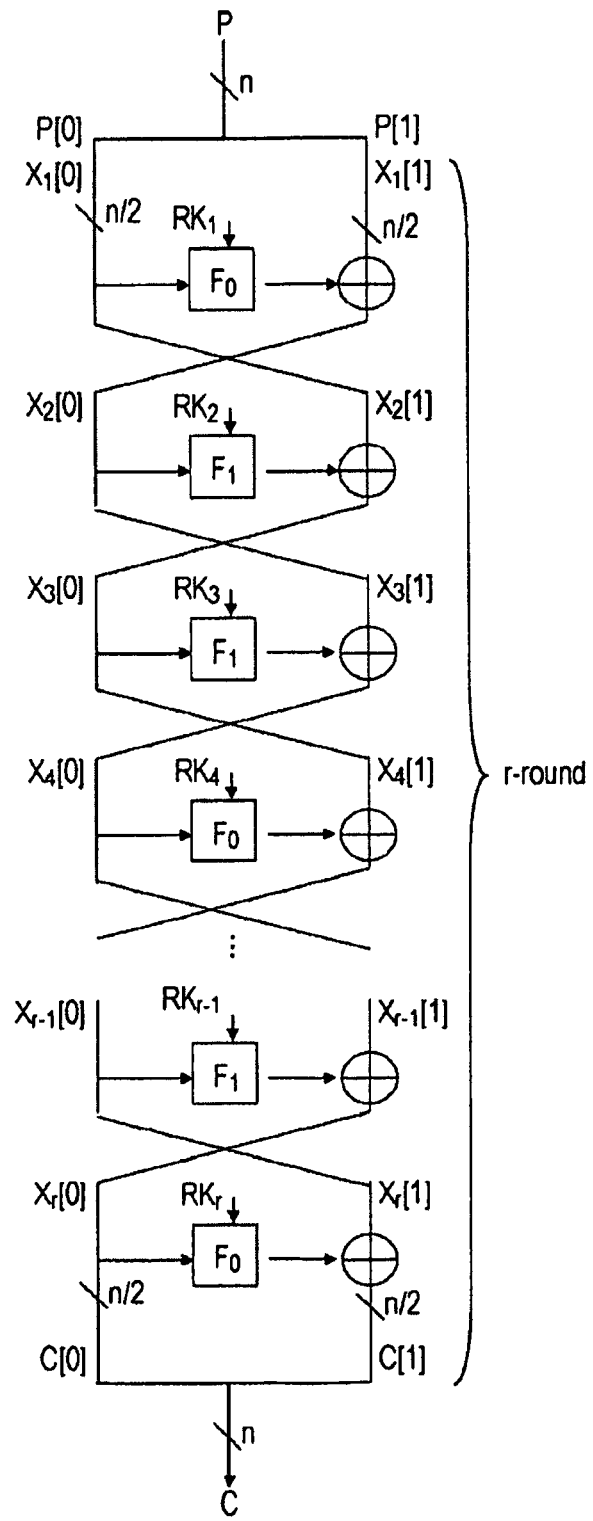
FIG. 3 is a diagram showing an example of a cryptographic processing configuration having a Feistel structure of the related art to which a diffusion-matrix switching mechanism (DSM) is applied.
Figure 4:
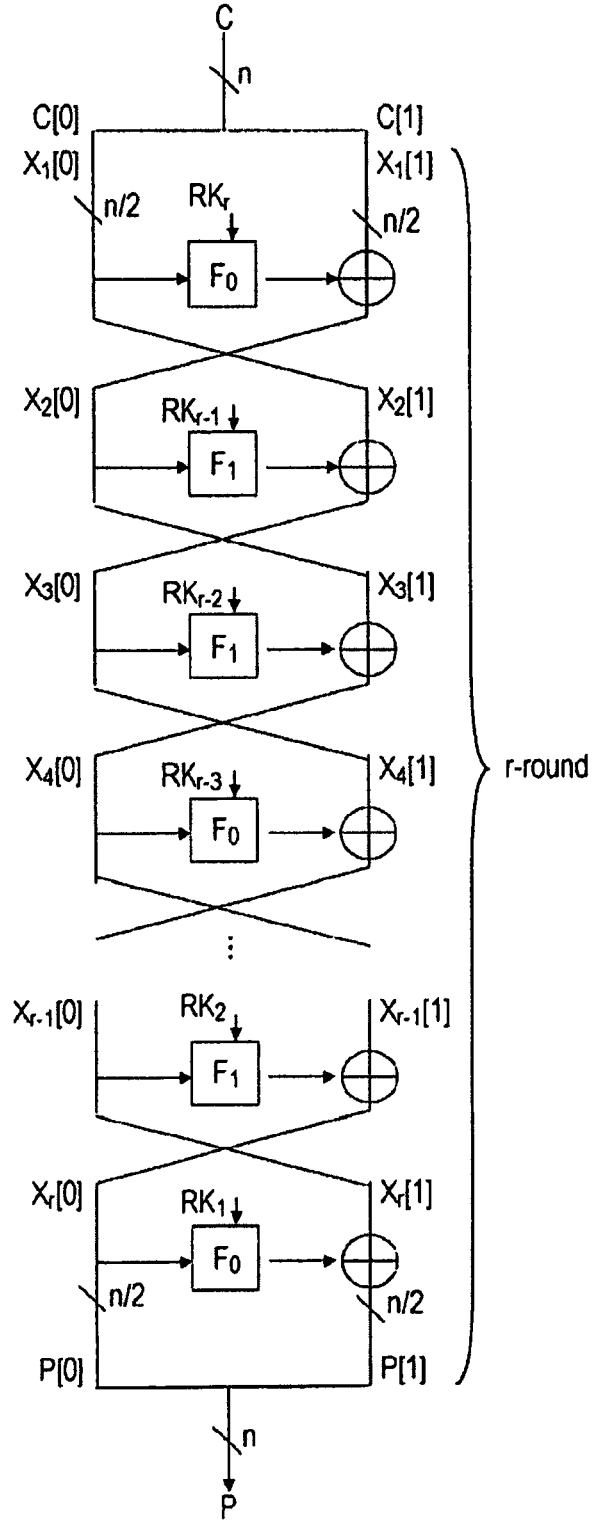
FIG. 4 is a diagram showing an example of a decryption processing configuration having a Feistel structure of the related art to which a diffusion-matrix switching mechanism (DSM) is applied.

In a Feistel structure having the diffusion-matrix switching mechanism (DSM) with the number of data lines (the number of divisions)=2 as shown in FIG. 7, as explained earlier with reference to FIGS. 3 and 4, a configuration in which involution properties can be achieved, that is, an encryption function and a decryption function can be shared, can be achieved by suitably arranging F-functions.

However, unlike a Feistel structure having only two data lines, in an extended Feistel structure (GFN: Generalized Feistel Network) in which the number of data lines (the number of divisions) d is allowed to be set to an arbitrary number of data lines greater than or equal to 3, such as 3 or 4, that is, in a configuration in which plaintext P as the input is divided into three data lines P[0], P[1], and P[2], which are then input to round function sections, or is divided into four data lines P[0], P[1], P[2], and P[3], which are then input to round function sections, or the like, it is difficult to hold involution properties that allow an encryption function and a decryption function to be shared. The present invention proposes a configuration in which involution properties that allow an encryption function and a decryption function to be shared are realized in such an extended Feistel structure.

[3. With Regard to Extended Feistel Structure (GFN: Generalized Feistel Network)]

An extended Feistel structure (GFN: Generalized Feistel Network) will be explained. In the present invention, SP type F-functions are handled, which is the same as that in the Feistel structure having two data lines described above; however, an extended Feistel structure (GFN) in which the number of data lines (the number of divisions) is set to an arbitrary number d greater than or equal to 3 is targeted, where d denotes an integer equal to or more than 3.

(3-1) With Regard to Extended Feistel Structure (GFN) Having No Diffusion-Matrix Switching Mechanism (DSM)

Figure 8:
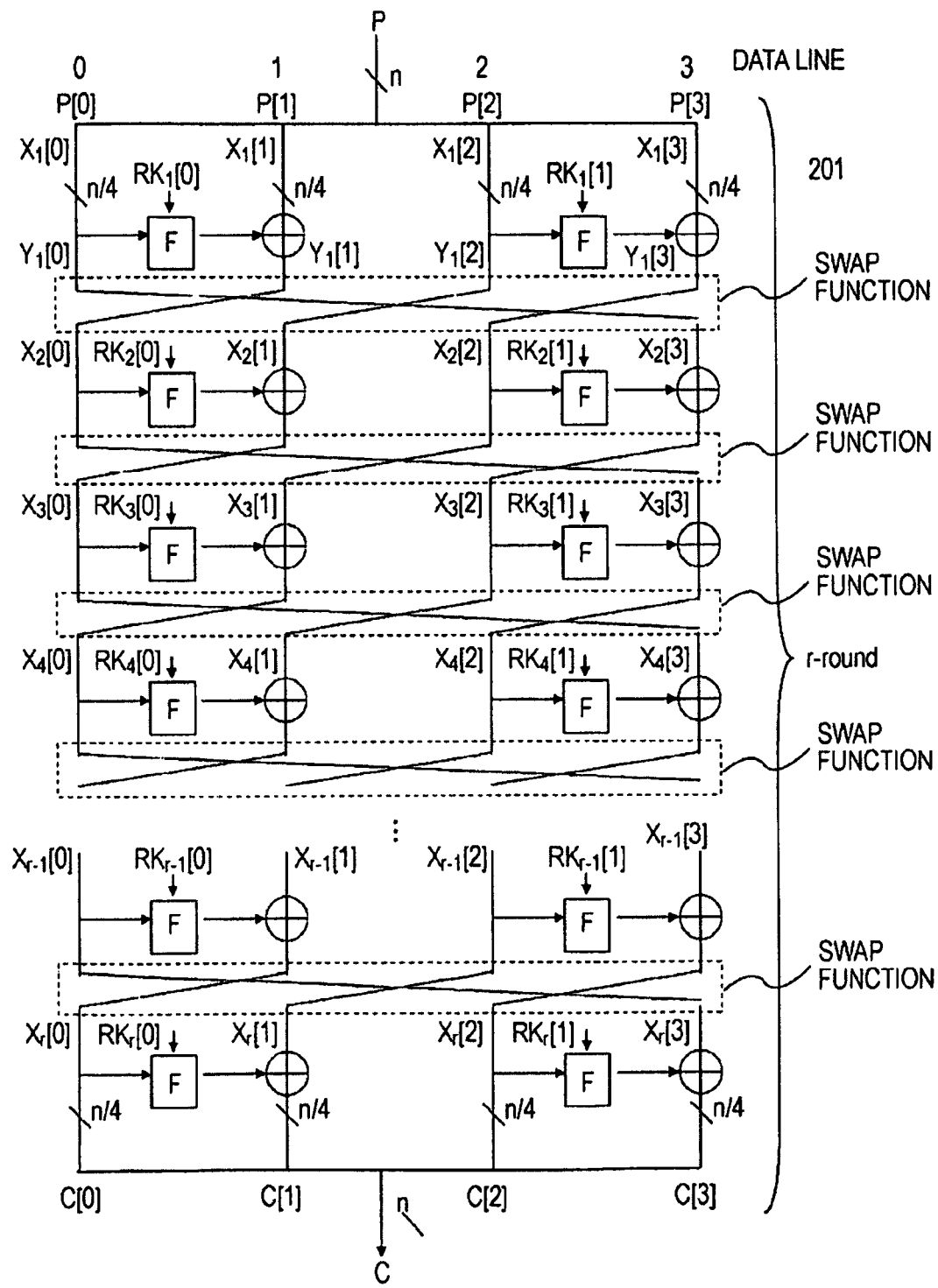
FIG. 8 is a diagram showing an example configuration of an encryption processing configuration having an extended Feistel structure (GFN) having no diffusion-matrix switching mechanism (DSM).

First, FIG. 8 shows an example configuration of an encryption processing configuration having an extended Feistel structure (GFN) having no diffusion-matrix switching mechanism (DSM). Note that the encryption processing configuration shown in FIG. 8 corresponds to an encryption function that can be executed by applying hardware or software. As described previously, an encryption function and a decryption function are configured to hold involution properties in which a common function can be applied, whereby the advantages of reducing implementation cost, reducing the size of the apparatus, etc., can be achieved.

The example shown in FIG. 8 is an example configuration of an encryption function with an extended Feistel structure (GFN) in which the number of data lines (the number of divisions) d is set to d=4. Furthermore, since the configuration has no diffusion-matrix switching mechanism (DSM), linear transformation matrices applied in the respective rounds are the same, and processes performed in the respective F-functions are the same.

As described previously, in an extended Feistel structure (GFN), the number of data lines (the number of divisions) can be given by an arbitrary integer d greater than or equal to 3. In the following exemplary embodiment, an example configuration in which the number of data lines (the number of divisions) d is set to d=4 will be explained. Note that the present invention is not limited to d=4 and can be applied to an extended Feistel structure (GFN) having an arbitrary number of data lines (the number of divisions) greater than or equal to 3.

In the configuration of the encryption function shown in FIG. 8, the input is plaintext P. The plaintext P is divided into four data lines P[0], P[1], P[2], and P[3] (the number of divisions=4), and data transformation to which F-functions are applied is sequentially executed in respective rounds to output C[0], C[1], C[2], and C[3], which constitute ciphertext C, as results of the transformation for r rounds. In the F-functions for each round, round keys (sub-keys) $RK_i[0]$ and $RK_i[1]$ serving as elements constituting an expanded key generated on the basis of a master key (main key) supplied from a key scheduling section, which is not shown in the figure, are input and applied to data transformation. Note that "i" of the key $RK_i[n]$ denotes a round, and "n" denotes the identifier of a round key in the same round.

In the configuration shown in FIG. 8, the n-bit plaintext P is processed r times (r stages) using the F-functions to which round keys $RK_1, RK_2, \ldots, RK_r$ are input, and, as a result, ciphertext C is obtained. Quarters into which the plaintext P is divided are respectively represented by P[0], P[1], P[2], and P[3], and halves into which the round key RK1 is divided are respectively represented by $RK_1[0]$ and $RK_1[1]$. In the process at the first stage, first, an exclusive-OR operation (EXOR) between the processing result at the F-function to which the data segment P[0] and the round key $RK_1[0]$ are input and the data segment P[1] is performed, and an exclusive-OR operation (EXOR) between the processing result at the F-function to which the data segment P[2] and the round key $RK_1[1]$ are input and the data segment P[3] is performed.

Further, the respective results are denoted by $Y_1[1]$ and $Y_1[3]$, and P[0] and P[2] are set to $Y_1[0]$ and $Y_1[2]$, respectively. When the processing results at the first stage, that is, the input values at the second stage, are denoted by $X_2[0]$, $X_2[1]$, $X_2[2]$, and $X_2[3]$, $Y_1[1]$ is substituted into $X_2[0]$,
$Y_1[2]$ is substituted into $X_2[1]$,
$Y_1[3]$ is substituted into $X_2[2]$, and
$Y_1[0]$ is substituted into $X_2[3]$.

Such a data permutation process is defined as "swap (permutation) function".

As shown in FIG. 8, a swapping process for permuting the respective data lines is executed in portions where the respective rounds are switched. A function to be applied to this swapping process is a swap function. A swap function serves as an element constituting an encryption function. As shown in FIG. 8, a swap function 201 is a function that is applied to outputs of the respective data lines at the time of switching between the respective rounds to set the lines to be input in a next round, which correspond to the outputs of the respective data lines.

In FIG. 8, for example, when data lines are represented by, as shown in the upper stage of FIG. 8, data lines 0, 1, 2, and 3 from the left, the permutation of the outputs of the four lines in a preceding round and the lines to be input for the subsequent round is switched using the swap function 201 as follows:

The output of the data line 0 in the preceding round is set as the input of the data line 3 in the subsequent round.
The output of the data line 1 in the preceding round is set as the input of the data line 0 in the subsequent round.
The output of the data line 2 in the preceding round is set as the input of the data line 1 in the subsequent round.
The output of the data line 3 in the preceding round is set as the input of the data line 2 in the subsequent round.

A function that executes such a line permutation process is a swap function applied in encryption processing.

Figure 9:
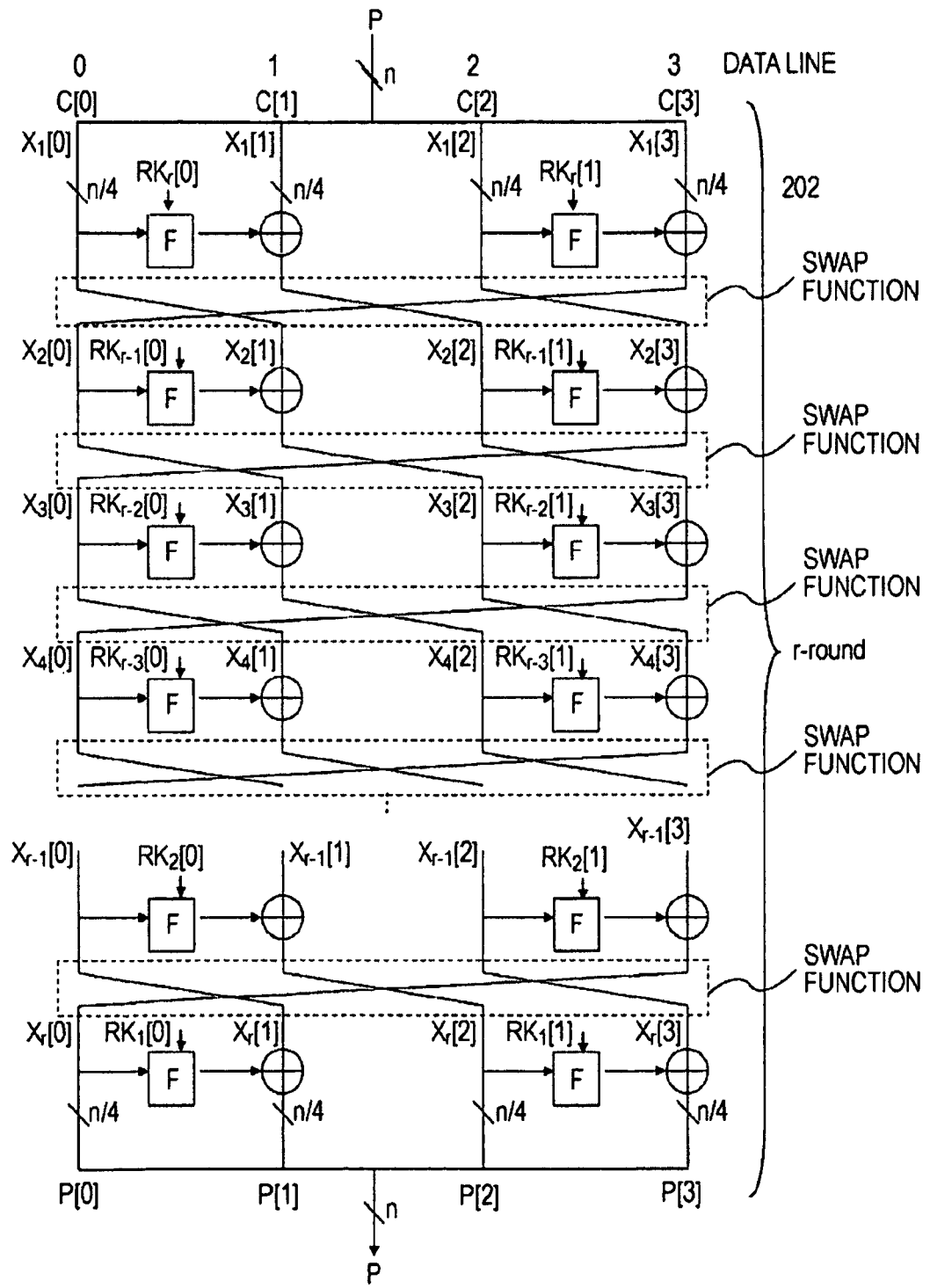
FIG. 9 is a diagram showing an example configuration of a decryption processing configuration having an extended Feistel structure (GFN) having no diffusion-matrix switching mechanism (DSM).

FIG. 9 shows an example configuration of a decryption processing configuration that decrypts results obtained by executing encryption processing by applying the encryption processing configuration of the extended Feistel structure (GFN) with d=4 shown in FIG. 8. Since the configuration has no diffusion-matrix switching mechanism (DSM), linear transformation matrices applied in the respective rounds are the same, and processes performed in the respective F-functions are the same.

Note that the decryption processing configuration shown in FIG. 9 corresponds to a decryption function that can be executed by applying hardware or software. As described previously, an encryption function and a decryption function are configured to hold involution properties in which a common function can be applied, whereby the advantages of reducing implementation cost, reducing the size of the apparatus, etc., can be achieved.

In the configuration of the decryption function shown in FIG. 9, the input is ciphertext C. The ciphertext C is divided into four data lines C[0], C[1], C[2], and C[3] (the number of divisions=4), and data transformation to which F-functions are applied is sequentially executed in respective rounds to output P[0], P[1], P[2], and P[3], which constitute plaintext P, as results of the transformation for r rounds. In the F-functions for each round, round keys (sub-keys) $RK_i[0]$ and $RK_i[1]$ serving as elements constituting an expanded key generated on the basis of a master key (main key) supplied from a key scheduling section, which is not shown in the figure, are input and applied to data transformation.

As shown in FIG. 9, the order of the applied keys in the respective rounds is opposite to that of the applied keys in the respective rounds of the encryption function shown in FIG. 8. Furthermore, also in the decryption function shown in FIG. 9, a swapping process for permuting the respective data lines is executed in portions where the rounds are switched. This swapping process is a process different from the swapping process shown in FIG. 8. As shown in FIG. 9, a swap function 202 is a function that is applied to outputs of the respective data lines at the time of switching between the respective rounds to set the lines to be input in a next round, which correspond to the outputs of the respective data lines.

In FIG. 9, for example, when data lines are represented by, as shown in the upper stage of FIG. 9, data lines 0, 1, 2, and 3 from the left, the permutation of the outputs of the four lines in a preceding round and the lines to be input for the subsequent round is switched using the swap function 202 as follows:

The output of the data line 0 in the preceding round is set as the input of the data line 1 in the subsequent round.

The output of the data line 1 in the preceding round is set as the input of the data line 2 in the subsequent round.

The output of the data line 2 in the preceding round is set as the input of the data line 3 in the subsequent round.

The output of the data line 3 in the preceding round is set as the input of the data line 0 in the subsequent round.

A function that executes such a line permutation process is the swap function applied in the decryption processing.

In this manner, the swap function 201 applied to the encryption processing configuration shown in FIG. 8 and the swap function 202 applied to the decryption processing configuration shown in FIG. 9 have different swapping process styles, and the same function cannot be commonly utilized in encryption processing and decryption processing. In the Feistel structure with the number of data lines (the number of divisions) d=2 as shown in FIGS. 1 to 4, the permutation of the lines is executed only for the data lines 0 and 1, and it is possible to perform a process commonly utilizing a similar swap function in encryption and decryption processing. In an extended Feistel structure (GFN) that is allowed to have an arbitrary number of data lines (the number of divisions) d greater than or equal to 3 such as the number of data lines (the number of divisions) d=3, 4, 5 . . . , however, a swap (permutation) function between the respective rounds in an encryption function is different from that in a decryption function, resulting in a problem in that the encryption function and the decryption function cannot simply use the same function, unlike a standard Feistel structure with the limitation of the number of data lines (the number of divisions) d=2.

(3-2) With Regard to Extended Feistel Structure (GFN) Having Diffusion-Matrix Switching Mechanism (DSM)

Figure 10:
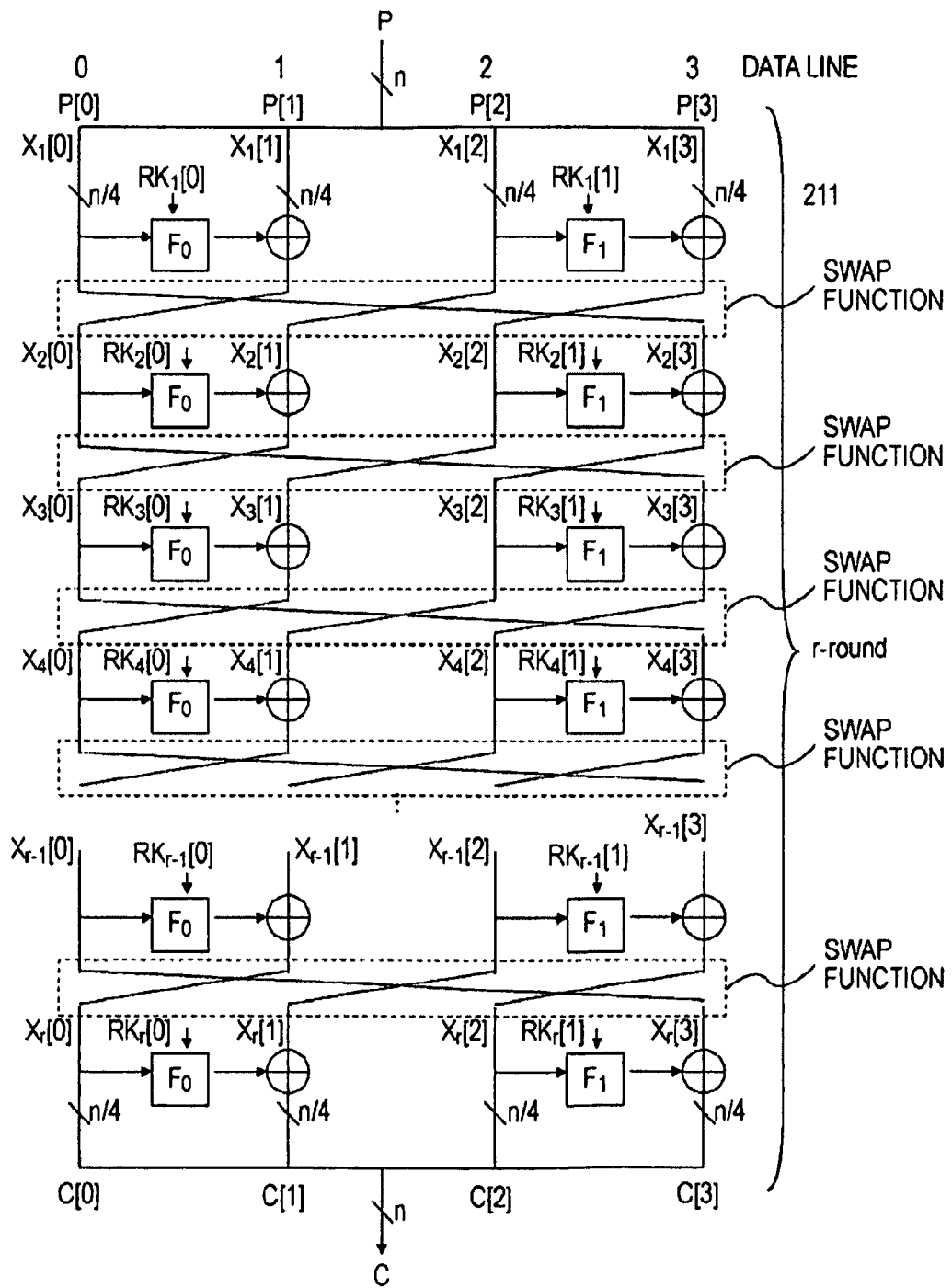
FIG. 10 is a diagram showing an example configuration of an encryption processing configuration having an extended Feistel structure (GFN) having a diffusion-matrix switching mechanism (DSM).

Next, an extended Feistel structure (GFN) having a diffusion-matrix switching mechanism (DSM) will be explained. FIG. 10 shows an example configuration of an encryption function having an extended Feistel structure (GFN) having a diffusion-matrix switching mechanism (DSM). The example shown in FIG. 10 is an example configuration of an encryption function of an extended Feistel structure (GFN) having a diffusion-matrix switching mechanism (DSM), wherein the number of data lines (number of divisions) d is set to d=4.

As described previously, an extended Feistel structure (GFN) having a diffusion-matrix switching mechanism (DSM) is configured to arrange two or more different matrices in linear transformation sections of round function (F-function) sections in a Feistel structure so that the matrices are switched every round. DSM enables enhancement of resistance to differential attacks or linear attacks. In the example shown in FIG. 10, F-functions $F_0$ and $F_1$ are configured to execute data transformation to which different linear transformation matrices are applied. Note that linear transformation matrices to be applied in those F-functions are set to matrices satisfying certain specific conditions, thus enabling significant enhancement of resistance to differential attacks or linear attacks. This configuration is described in detail in Japanese Patent Application No. 2006-206376, which is a prior application filed by the present applicant.

In the configuration of the encryption function shown in FIG. 10, the input is plaintext P. The plaintext P is divided into four data lines P[0], P[1], P[2], and P[3] (the number of divisions=4), and data transformation to which the F-functions $F_0$ and $F_1$ are applied is sequentially executed in respective rounds to output C[0], C[1], C[2], and C[3], which constitute ciphertext C, as results of the transformation for r rounds. In the F-functions $F_0$ and $F_1$ for each round, round keys (sub-keys) $RK_i[0]$ and $RK_i[1]$ serving as an element constituting an expanded key generated on the basis of a master key (main key) supplied from a key scheduling section, which is not shown in the figure, is input and applied to data transformation. Note that "i" of the key $RK_i(n)$ denotes a round, and "n" denotes the identifier of a round key in the same round.

As shown in FIG. 10, also in an extended Feistel structure (GFN) having a diffusion-matrix switching mechanism (DSM), a swapping process for permuting the respective data lines is executed in portions where the respective rounds are switched. As shown in FIG. 10, a swap function 211 is applied to outputs of the respective data lines at the time of switching between the respective rounds to set the lines to be input in a next round, which correspond to the outputs of the respective data lines.

In FIG. 10, when data lines are represented by, as shown in the upper stage of FIG. 10, data lines 0, 1, 2, and 3 from the left, the permutation of the outputs of the four lines in a preceding round and the lines to be input for the subsequent round is switched using the swap function 211 as follows:

The output of the data line 0 in the preceding round is set as the input of the data line 3 in the subsequent round.

The output of the data line 1 in the preceding round is set as the input of the data line 0 in the subsequent round.

The output of the data line 2 in the preceding round is set as the input of the data line 1 in the subsequent round.

The output of the data line 3 in the preceding round is set as the input of the data line 2 in the subsequent round.

A function that executes such a line permutation process is a swap function applied in encryption processing.

Figure 11:
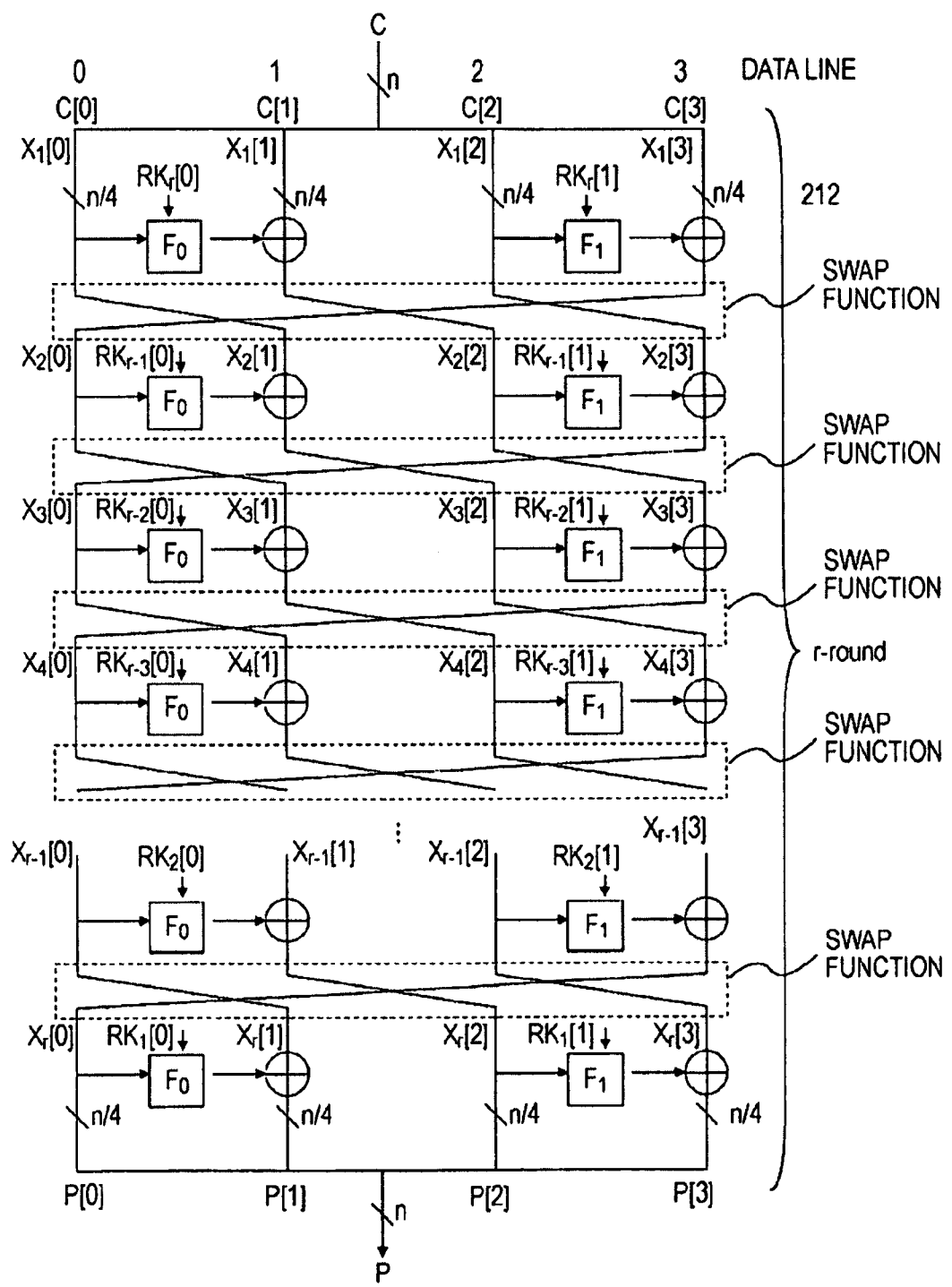
FIG. 11 is a diagram showing an example configuration of a decryption processing configuration having an extended Feistel structure (GFN) having a diffusion-matrix switching mechanism (DSM).

FIG. 11 shows an example configuration of a decryption function that decrypts results obtained by executing encryption processing on an encryption function of the extended Feistel structure (GFN) shown in FIG. 10 having a diffusion-matrix switching mechanism (DSM) in which d=4 is set. In the configuration of the decipher function shown in FIG. 11, the input is ciphertext C. The ciphertext C is divided into four data lines C[0], C[1], C[2], and C[3] (the number of divisions=4), and data transformation to which F-functions $F_0$ and $F_1$ are applied is sequentially executed in respective rounds to output P[0], P[1], P[2], and P[3], which constitute plaintext P, as results of the transformation for r rounds. In the F-functions $F_0$ and $F_1$ for each round, round keys (sub-keys) $RK_i[0]$ and $RK_i[1]$ serving as elements constituting an expanded key generated on the basis of a master key (main key) supplied from a key scheduling section, which is not shown in the figure, are input and applied to data transformation.

As shown in FIG. 11, the order of the applied keys in the respective rounds is opposite to that of the applied keys in the respective rounds of the encryption function shown in FIG. 10. Furthermore, also in the decryption function shown in FIG. 11, a swapping process for permuting the respective data lines is executed in portions where the rounds are switched. This swapping process is a process different from the swapping process shown in FIG. 10. As shown in FIG. 11, a swap function 212 is a function that is applied to outputs of the respective data lines at the time of switching between the respective rounds to set the lines to be input in a next round, which correspond to the outputs of the respective data lines.

In FIG. 11, for example, when data lines are represented by, as shown in the upper stage of FIG. 11, data lines 0, 1, 2, and 3 from the Left, the permutation of the outputs of the four lines in a preceding round and the lines to be input for the subsequent round is switched using the swap function 212 as follows:

The output of the data line 0 in the preceding round is set as the input of the data line 1 in the subsequent round.

The output of the data line 1 in the preceding round is set as the input of the data line 2 in the subsequent round.

The output of the data line 2 in the preceding round is set as the input of the data line 3 in the subsequent round.

The output of the data line 3 in the preceding round is set as the input of the data line 0 in the subsequent round.

A function that executes such a line permutation process is a swap function applied in decryption processing.

In this manner, the swap function 211 applied to the encryption processing configuration shown in FIG. 10 and the swap function 212 applied to the decryption processing configuration shown in FIG. 11 have different swapping process styles, and cannot commonly utilize the same function.

As described above, in an extended Feistel structure (GFN) that is allowed to have an arbitrary number of data lines (the number of divisions) d greater than or equal to 3 such as the number of data lines (the number of divisions) d=3, 4, 5 . . . , in either an extended Feistel structure (GFN) having no diffusion-matrix switching mechanism (DSM) or an extended Feistel structure (GFN) having a diffusion-matrix switching mechanism (DSM), a swap (permutation) function between the respective rounds in an encryption function is different from that in a decryption function, resulting in a problem in that the encryption function and the decryption function cannot simply use the same function, unlike a standard Feistel structure with the limitation of the number of data lines (the number of divisions) d=2.

Given a configuration in which the same swap function can be applied to both encryption processing and decryption processing, when a cryptographic processing apparatus is constructed, it is possible to reduce implementation cost in either hardware implementation or software implementation, leading to the achievement of size reduction of the apparatus, particularly, in the case of hardware implementation. Another advantage is that verification cost is halved. That is, it is only required to verify one of an encryption function and a decryption function in order to verify function sections. Additionally, in software, there are significant advantages such as halving the code size. It is therefore desirable to provide a configuration that uses the same function for an encryption function and a decryption function as far as possible.

However, block ciphers are generally demanded to be executed at one time at a significantly short speed and to work at a high speed. Therefore, it would be desirable to prevent the execution speed from being reduced due to the sharing of an encryption function and a decryption function. In order to meet such a requirement, it is desirable to provide a configuration in which a greater number of functions that can be commonly utilized for an encryption function and a decryption function are set and in which the execution speed is not reduced. Such a configuration will be explained hereinafter.

[4. With Regard to Involution Properties Holding Structure in Extended Feistel Structure (GFN)]

An example configuration in which involution properties, that is, the application of a common function to encryption processing and decryption processing, can be achieved in an extended Feistel structure (GFN) will be explained.

A conceivable simple technique for utilizing a common function in encryption processing and decryption processing is to employ a configuration in which only a swap function part is input from outside. That is, a configuration is provided in which only a swap function section is switched in an encryption function and a decryption function and in which remaining function parts are commonly utilized.

With the use of this configuration, like a standard Feistel structure in which the number of data lines (the number of divisions) d=2 is set, round keys are permuted for each round (stage) and further it is only required to utilize a swap function to be applied at the time of switching between the rounds by suitably permuting the swap function in cryptographic processing and decryption processing. In remaining function parts, the same function can be used for both the encryption processing and the decryption processing. For example, a configuration is provided such that two types of swap functions, namely, an encryption swap function and a decryption swap function, are created and the functions are given from outside.

This technique, however, requires the encryption swap function and the decryption swap function to be invoked every time each round is switched in a period of execution of each of encryption processing and decryption processing, and also requires the function invoking process to be repeatedly executed. Such a function invoking process causes time consumption, resulting in a problem in that the processing time is increased. In general, in block ciphers executed at one time for a significantly short duration, the occurrence of such a new function invoking process leads to a significant reduction in execution speed and a reduction in performance. Therefore, in a case where realistic use is taken into account, it is not preferable to apply such a configuration of invoking swap functions.

In a case where implementation is taken into account, it is necessary to provide a configuration that prevents the reduction in processing speed, and it is desirable to provide a configuration capable of sharing an encryption function and a decryption function without modifying swap parts. A specific example configuration of such a configuration will be explained hereinafter. The following items will be separately explained.

(4-1) With Regard to Involution Properties Holding Structure in Extended Feistel Structure (GFN) Having No Diffusion-Matrix Switching Mechanism (DSM)

(4-2) With Regard to Involution Properties Holding Structure in Extended Feistel Structure (GFN) Having Diffusion-Matrix Switching Mechanism (DSM)

Note that in the following explanation, it is assumed that an extended Feistel structure (GFN) is an extended Feistel structure having a number of divisions d≥3 and satisfying conditions explained hereinafter, which is referred to as an extended Feistel structure type 2. An extended Feistel structure type 2 applied in the present invention will be explained with reference to FIG. 12.

Figure 12:
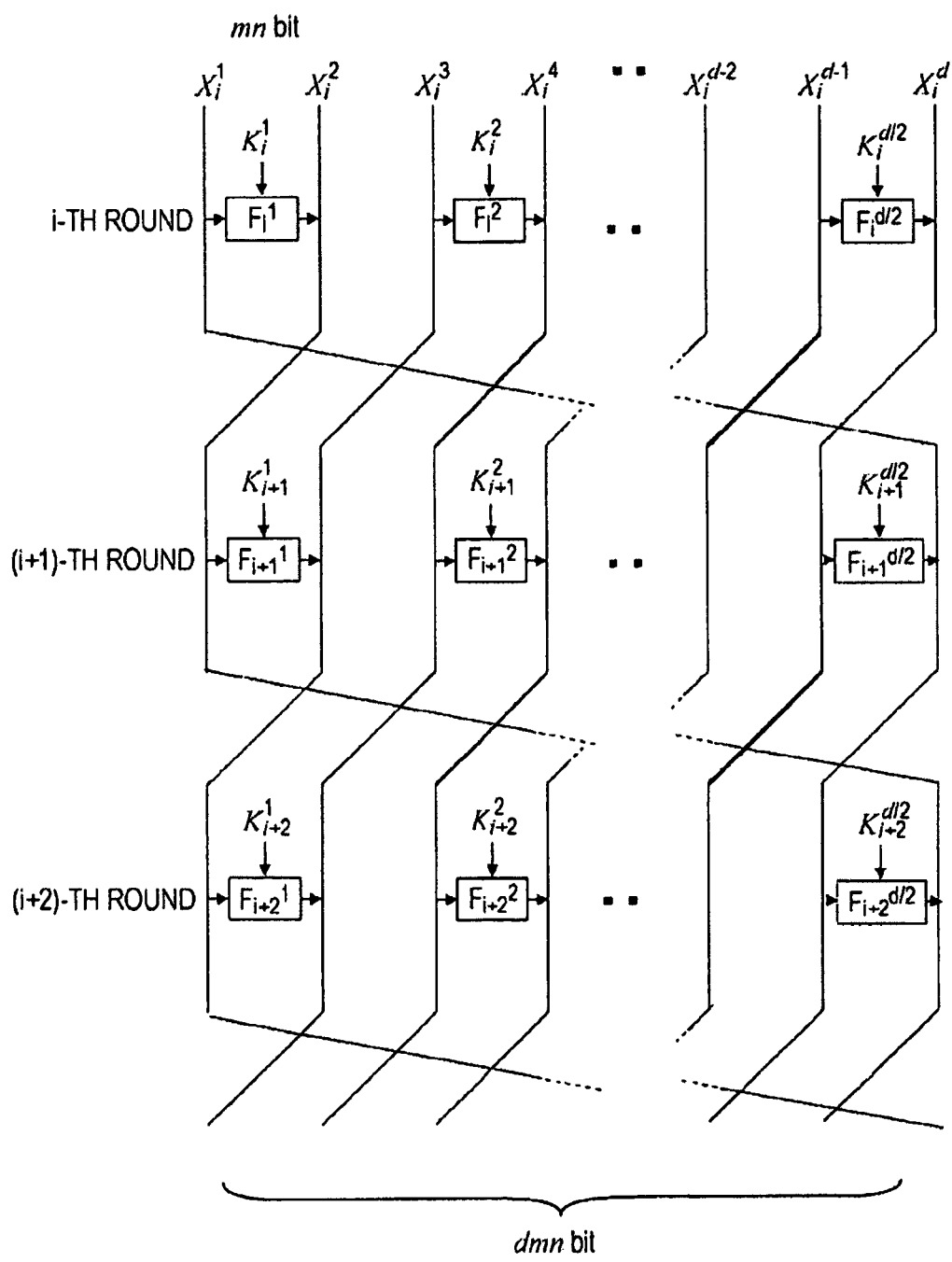
FIG. 12 is a diagram explaining an extended Feistel structure type 2 to which the present invention can be applied.

An extended Feistel structure type 2 of the present invention has the following parameters:

(a) the number of data divisions: d (where d is an even number of 4 or more), (b) the length of input/output data: dmn bits, (c) the length of data segment: mn bits, and (d) the number of F-functions per round: d/2, As shown in FIG. 12, F-functions are applied to odd-number-th mn-bit data lines counted from the left end within each round, and processing results of the F-functions are output, which are exclusive-ORed with immediately adjacent data. In the figure, the operational sign of exclusive-OR is omitted. As shown in the figure, a configuration is taken in which in each round, the data line at the left end for which data has been input to the F-function is moved to the right end in the next round and the remaining data lines are shifted one to the left. An extended Feistel structure having such a structure is defined as an extended Feistel structure type 2.

(4-1) With Regard to Involution Properties Holding Structure in Extended Feistel Structure (GFN) Having No Diffusion-Matrix Switching Mechanism (DSM)

First, an involution properties holding structure in an extended Feistel structure (GFN) having no diffusion-matrix switching mechanism (DSM) will be explained.

Figure 13:
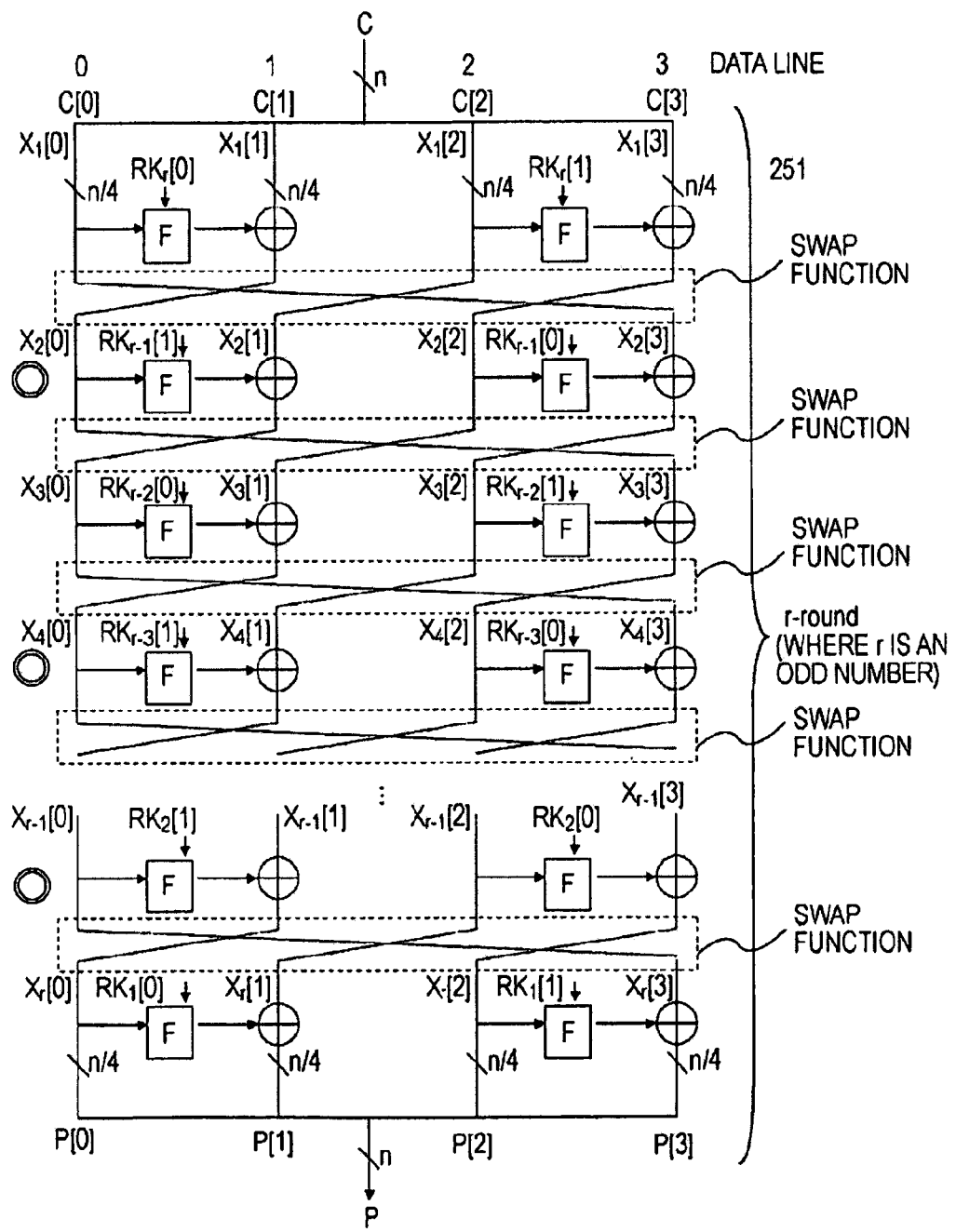
FIG. 13 is a diagram showing an example of a decryption processing configuration configured to allow involution properties to be held in an extended Feistel structure (GFN) having no diffusion-matrix switching mechanism (DSM).

FIG. 13 shows an example of a decryption processing configuration configured to allow involution properties to be held in an extended Feistel structure (GFN) having no diffusion-matrix switching mechanism (DSM).

The decryption processing configuration shown in FIG. 13 is an example configuration of a decryption function corresponding to the example configuration of the encryption function of the extended Feistel structure (GFN) having no diffusion-matrix switching mechanism (DSM), which has been explained earlier with reference to FIG. 8, in which the number of data lines (the number of divisions) d is set to d=4. That is, a configuration that executes decryption processing that can be applied to decryption of ciphertext generated in the cryptographic processing configuration explained with reference to FIG. 8 is shown. Note that the decryption processing configuration shown in FIG. 13 corresponds to a decryption function that can be executed by applying hardware or software. As described previously, an encryption function and a decryption function are configured to hold involution properties in which a common function can be applied, whereby the advantages of reducing implementation cost, reducing the size of the apparatus, etc., can be achieved.

In the decryption processing configuration shown in FIG. 9 explained earlier as a decryption processing configuration corresponding to the cryptographic processing configuration shown in FIG. 8, due to the different swap functions being applied, a cipher function and a decryption function have different configurations and cannot hold the involution properties. In the decryption processing configuration shown in FIG. 13, however, a configuration is provided in which a swapping process is performed in the same style as that of the swap function applied in the cryptographic processing configuration shown in FIG. 8. That is, a configuration is obtained in which swap functions applied in encryption processing and decryption processing are set as a common function. That is, the encryption function (FIG. 8) and the decryption function (FIG. 13) realize a configuration that allows involution properties in which a common function can be applied to be held.

However, the decryption processing configuration shown in FIG. 13 is a decryption processing configuration in a case where the number of rounds r is an odd number. A decryption processing configuration that holds the involution properties, which corresponds to the encryption function (FIG. 8) in a case where the number of rounds r is an even number, has a configuration shown in FIG. 14.

First, the configuration of the decryption function shown in FIG. 13, which is a decryption processing configuration in a case where the number of rounds r is an odd number, will be explained. In the decryption processing configuration of FIG. 13, the input is ciphertext C. The ciphertext C is divided into four data lines C[0], C[1], C[2], and C[3] (the number of divisions=4), and data transformation to which F-functions are applied is sequentially executed in the respective rounds to output P[0], P[1], P[2], and P[3], which constitute plaintext P, as results of the transformation for r rounds. In the F-functions for each round, round keys (sub-keys) $RK_i[0]$ and $RK_i[1]$ serving as elements constituting an expanded key generated on the basis of a master key (main key) supplied from a key scheduling section, which is not shown in the figure, are input and applied to data transformation.

In the decryption function shown in FIG. 13, the order of the applied keys in the respective rounds is opposite to that of the applied keys in the respective rounds of the encryption function shown in FIG. 8. This implies a relationship similar to the correspondence between the encryption function of FIG. 8 and the decryption function of FIG. 9.

In the decryption function in FIG. 13, however, a swapping process executed as a process of permuting the respective data lines in portions where the rounds are switched is a swapping process which is the same as the swapping process shown in FIG. 8. As shown in FIG. 13, a swap function 251 is applied to outputs of the respective data lines at the time of switching between the respective rounds to set the lines to be input in a next round, which correspond to the outputs of the respective data lines.

In FIG. 13, for example, when data lines are represented by, as shown in the upper stage of FIG. 13, data lines 0, 1, 2, and 3 from the left, the permutation of the outputs of the four lines in a preceding round and the lines to be input for the subsequent round is switched using the swap function 251 as follows:

The output of the data line 0 in the preceding round is set as the input of the data line 3 in the subsequent round.

The output of the data line 1 in the preceding round is set as the input of the data line 0 in the subsequent round.

The output of the data line 2 in the preceding round is set as the input of the data line 1 in the subsequent round.

The output of the data line 3 in the preceding round is set as the input of the data line 2 in the subsequent round.

A function that executes such a line permutation process is the swap function 251.

This swapping process is a line permutation process which is the same as that of the swap function in the encryption processing explained earlier with reference to FIG. 8.

Therefore, completely the same swap function can be applied in both the encryption processing shown in FIG. 8 and the decryption processing shown in FIG. 13.

In the decryption processing configuration shown in FIG. 13, in order to allow the swap function to have the same configuration as that of the encryption processing, it is devised to modify the input style of keys (round keys) input to the F-functions in each round. Within the decryption processing configuration shown in FIG. 13, in even-numbered rounds indicated by double circles in the figure, round keys input to the respective F-functions are permuted. As shown in the figure, in the second round, which is a round located two rounds from the top in the decryption processing configuration shown in FIG. 13, a configuration is provided in which a round key $RK_{(r-1)}[1]$ is input to the left-hand-side F-function shown in the figure and in which a round key $RK_{(r-1)}[0]$ is input to the right-hand-side F-function. Subsequently, in the respective even-numbered rounds, namely, in the fourth round, the sixth round . . . , round keys input to the respective F-functions are permuted. This distinction is notable when compared with FIG. 9. In FIG. 9, for all rounds, the round key $RK_i[0]$ is input to the left-hand-side F-functions and the round key $RK_i[1]$ is input to the right-hand-side F-functions.

In this manner, in the decryption processing configuration shown in FIG. 13, by permuting round keys input to F-functions for the respective even-numbered rounds, the same swap function as the swap function applied in the cryptographic processing configuration shown in FIG. 8 can be applied, and involution properties of the encryption function and the decryption function are realized.

The decryption processing configuration shown in FIG. 13 is a decryption processing configuration in a case where the number of rounds r is an odd number. A decryption processing configuration that holds the involution properties, which corresponds to the encryption function (FIG. 8) in a case where the number of rounds r is an even number, has a configuration shown in FIG. 14.

Figure 14:
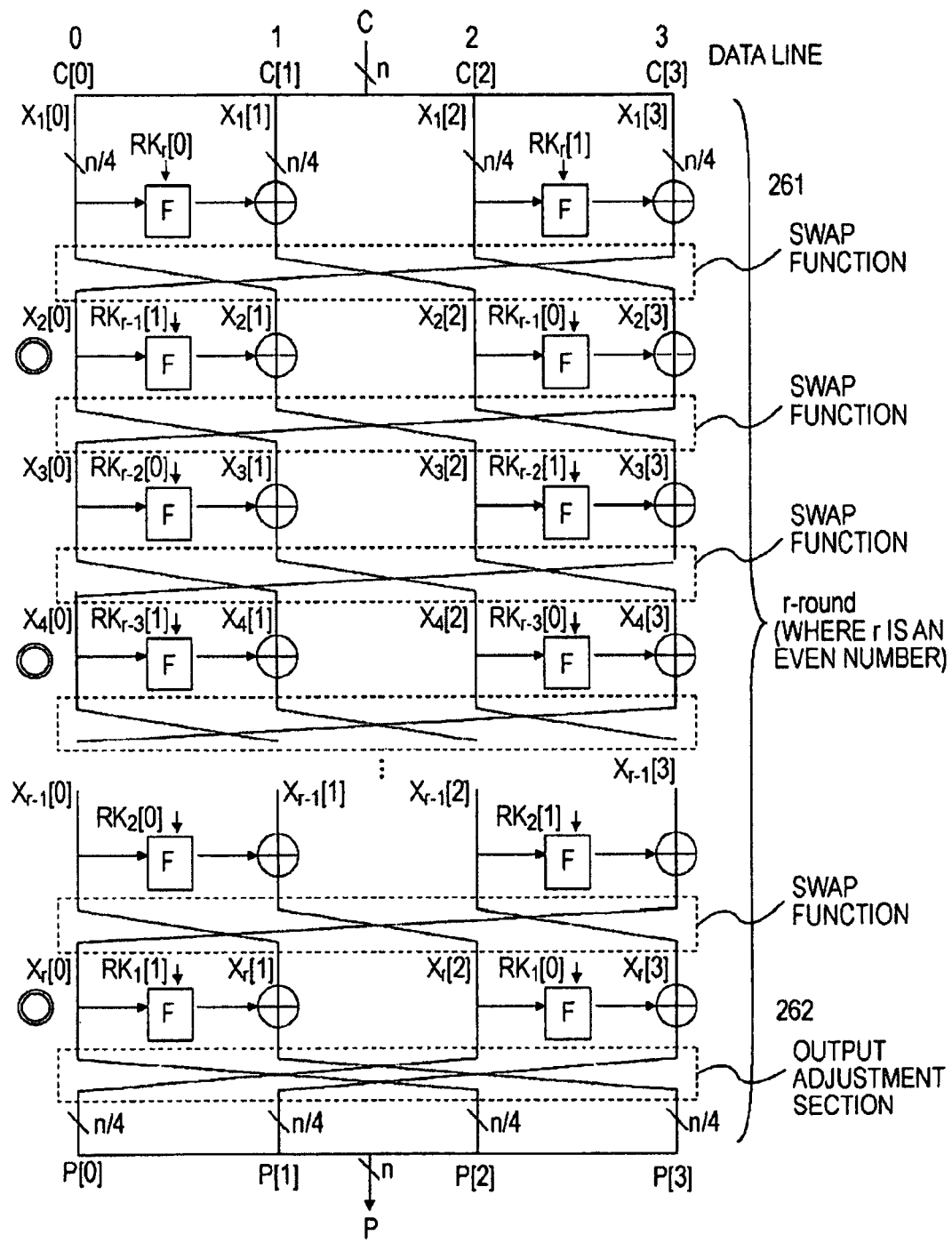
FIG. 14 is a diagram showing an example of a decryption processing configuration configured to allow involution properties to be held in an extended Feistel structure (GFN) having no diffusion-matrix switching mechanism (DSM).

The decryption processing configuration shown in FIG. 14 also represents a decryption processing configuration corresponding to a decryption function applied to the decryption processing of returning ciphertext encrypted using the cryptographic processing configuration shown in FIG. 8 into plaintext. In the configuration shown in FIG. 14, the number of rounds r is an odd number.

Like the decryption processing configuration shown in FIG. 13, the decryption processing configuration shown in FIG. 14 is also a configuration in which the permutation of round keys input to the F-functions set for the respective even-numbered rounds, which are indicated by double circles in the figure, is executed. Further, a configuration is obtained in which an output adjustment process is executed for the processing results on the final round. An output adjustment section 262 is executed as a process for obtaining the final output, namely, P[0], P[1], P[2], and P[3], by permuting the values of the respective data lines in the final round. It is only required to execute this part only once as a process to be performed after the execution of the decryption function, which does not cause significant reduction in efficiency.

Like the configuration shown in FIG. 13, a swap function 261 in the configuration shown in FIG. 14 has a configuration that performs the same swapping process as that of the swap function 201 in the encryption processing configuration explained with reference to FIG. 8. That is:

The output of the data line 0 in the preceding round is set as the input of the data line 3 in the subsequent round.

The output of the data line 1 in the preceding round is set as the input of the data line 0 in the subsequent round.

The output of the data line 2 in the preceding round is set as the input of the data line 1 in the subsequent round.

The output of the data line 3 in the preceding round is set as the input of the data line 2 in the subsequent round.

A function that executes such a line permutation process is the swap function 261.

This swapping process is the same line permutation process as that of the swap function 201 in the encryption processing explained earlier with reference to FIG. 8.

Therefore, completely the same swap function can be applied in both the encryption processing shown in FIG. 8 and the decryption processing shown in FIG. 13.

In the decryption processing configuration shown in FIG. 14, in order to allow the swap function to have the same configuration as that of the encryption processing, it is devised to modify the input style of keys (round keys) input to the F-functions in each round. It is further devised to provide a configuration in which an output adjustment process is executed for the processing results on the final round using the output adjustment section 262. This setting enables the same swap function as the swap function applied in the cryptographic processing configuration shown in FIG. 8 to be applied, and involution properties in which a common function can be applied to an encryption function and a decryption function are realized.

In an extended Feistel structure (GFN) having no diffusion-matrix switching mechanism (DSM), a structure that holds involution properties can be realized using the configuration described above. An encryption function and a decryption function in this process can be given as follows:

(encryption function)

$C = E(P, RK_1, RK_2, RK_3, RK_4, RK_5, \ldots, RK_{r-1}, RK_r)$ (decryption function (in a case where $r$ = odd number))

$P = D(P, RK_1, RK_2, RK_3, RK_4, RK_5, \ldots, RK_{r-1}, RK_r)$
$= E(P, RK_r, RK'_{r-1}, RK_{r-2}, RK'_{r-3}, RK_{r-4} \ldots, RK'_2, RK_1)$ (decryption function (in a case where $r$ = even number))

$P = D(P, RK_1, RK_2, RK_3, RK_4, RK_5, \ldots, RK_{r-1}, RK_r)$
$= HalfSwap\left(E\begin{pmatrix} P, RK_r, RK'_{r-1}, RK_{r-2}, RK'_{r-3}, \\ RK_{r-4} \ldots, RK_2, RK'_1 \end{pmatrix}\right)$ It can be found that suitable replacement of round keys allows both an encryption function and a decryption function to be shared.

However, if $RK_1=(RK_1[0]\|RK[1])$, then $RK'_1=(RK_1[1]\|RK_1[0])$, where HalfSwap denotes a function for permutation between preceding and subsequent input values.

Figure 15:
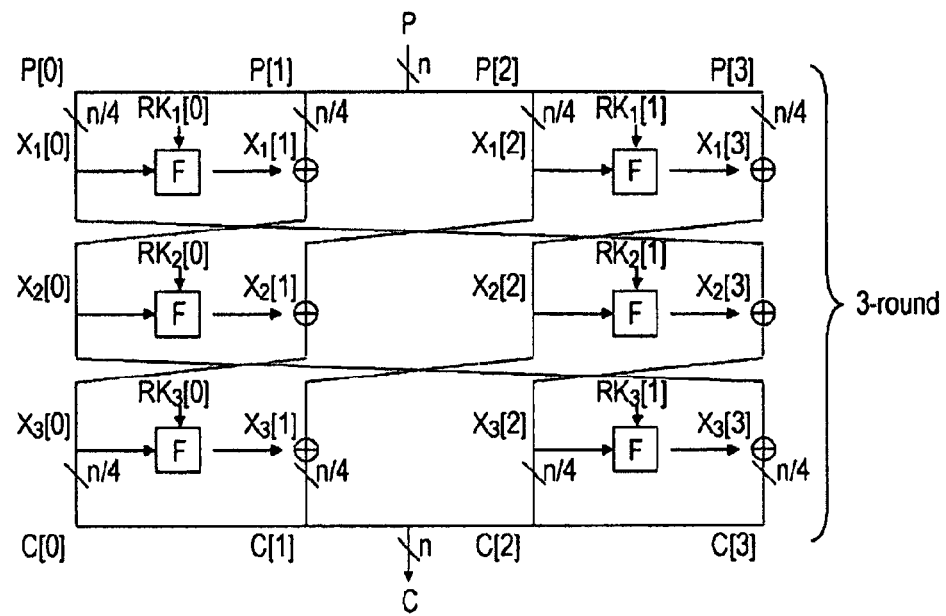
FIG. 15 is a diagram showing encryption and decryption functions of a three-stage GFN.
Figure 15:
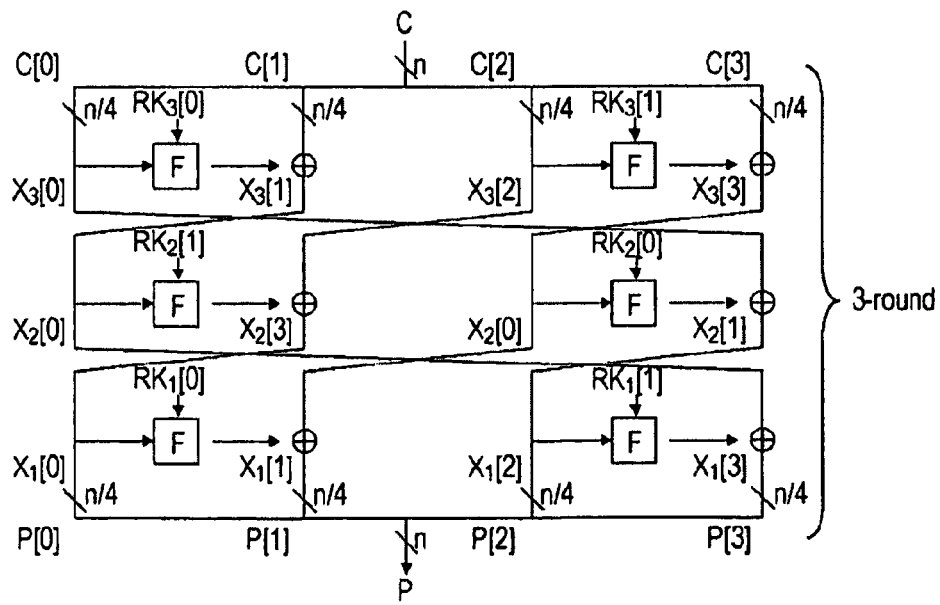

FIG. 15 shows encryption and decryption functions of a three-stage GFN as a detailed example in which the number of rounds is an odd number. The encryption function of FIG. 15 (FIG. 15(a)) is processed as below, where (+) as used in the following explanation denotes bitwise exclusive-OR.

[(0-th stage)]

$X_1[0]=P[0]$ $X_1[1]=P[1]$ $X_1[2]=P[2]$ $X_1[3]=P[3]$

[first stage]

$X_2[0]=F(X_1[0],RK_1[0])(+)X_1[1]$ $X_2[1]=X_1[2]$ $X_2[2]=F(X_1[2],RK_1[1])(+)X_1[3]$ $X_2[3]=X_1[0]$

[second stage]

$X_3[0]=F(X_2[0],RK_2[0])(+)X_2[1]$ $X_3[1]=X_2[2]$ $X_3[2]=F(X_2[2],RK_2[2])(+)X_2[3]$ $X_3[3]=X_2[0]$

[third stage]

$C[0]=X_3[0]$ $C[1]=F(X_3[0],RK_3[0])(+)X_3[1]$ $C[2]=X_3[2]$ $C[3]=F(X_3[2],RK_3[1])(+)X_3[3]$

In addition, the decryption function of FIG. 11 (FIG. 15(b)) is processed as follows:

[first stage]

$X_3[0]=C[0]$ $X_3[1]=F(X_3[0],RK_3[0])(+)C[1]$ $X_3[2]=C[2]$ $X_3[3]=F(X_3[2],RK_3[1])(+)C[3]$

[second stage]

$X_2[0]=X_3[3]$ $X_2[1]=F(X_2[0],RK_2[0])(+)X_3[0]$ $X_2[2]=X_3[1]$ $X_2[3]=F(X_2[2],RK_2[1])(+)X_3[2]$

[third stage]

$X_1[0]=X_2[3]$ $X_1[1]=F(X_1[0],RK_1[0])(+)X_2[0]$ $X_1[2]=X_2[1]$ $X_1[3]=F(X_1[2],RK_1[1])(+)X_2[2]$

[final stage]

$P[0]=X_1[0]$ $P[1]=X_1[1]$ $P[2]=X_1[2]$ $P[3]=X_3[3]$

As can be apparently seen from the above equation, data encrypted using an encryption function can be decrypted using an encryption function in which only round keys at even-numbered stages are suitably permuted. Note that in a case where the equations are generalized, the encryption function and the decryption function can be represented as follows:

[GFN encryption function(in a case where the number of stages is an odd number($r$=odd number))]

$X_1[0]=P[0]$ $X_1[1]=P[1]$ $X_1[2]=P[2]$ $X_1[3]=P[3]$ for $i$=2 to $r$ $X_i[0]=F(X_{i-1}[0],RK_{i-1}[0])(+)X_{i-1}[1]$ $X_i[1]=X_{i-1}[2]$ $X_i[2]=F(X_{i-1}[2],RK_{i-1}[2])(+)X_{i-1}[3]$ $X_i[3]=X_{i-1}[0]$ $C[0]=X_r[0]$ $C[1]=F(X_r[0],RK_r[0])(+)X_r[1]$ $C[2]=X_r[2]$ $C[3]=F(X_r[2],RK_r[1])(+)X_r[3]$

[GFN decryption function(in a case where the number of stages is an odd number($r$=odd number))]

$Xr[0]=C[0]$ $Xr[1]=F(X_r[0],RK_r[0])(+)C[1]$ $Xr[2]=C[2]$ $Xr[3]=F(X_r[2],RK_r[1])(+)C[3]$ for $i$=$r$−1 downto 1

$Xi[0]=X_{i+1}[3]$ $Xi[1]=F(X_i[0],RK_i[0])(+)X_{i+1}[0]$ $Xi[2]=X_{i+1}[1]$ $Xi[3]=F(X_i[2],RK_i[1])(+)X_{i+1}[2]$ $P[0]=X_1[0]$ $P[1]=X_1[1]$ $P[2]=X_1[2]$ $P[3]=X_1[3]$

Figure 16:
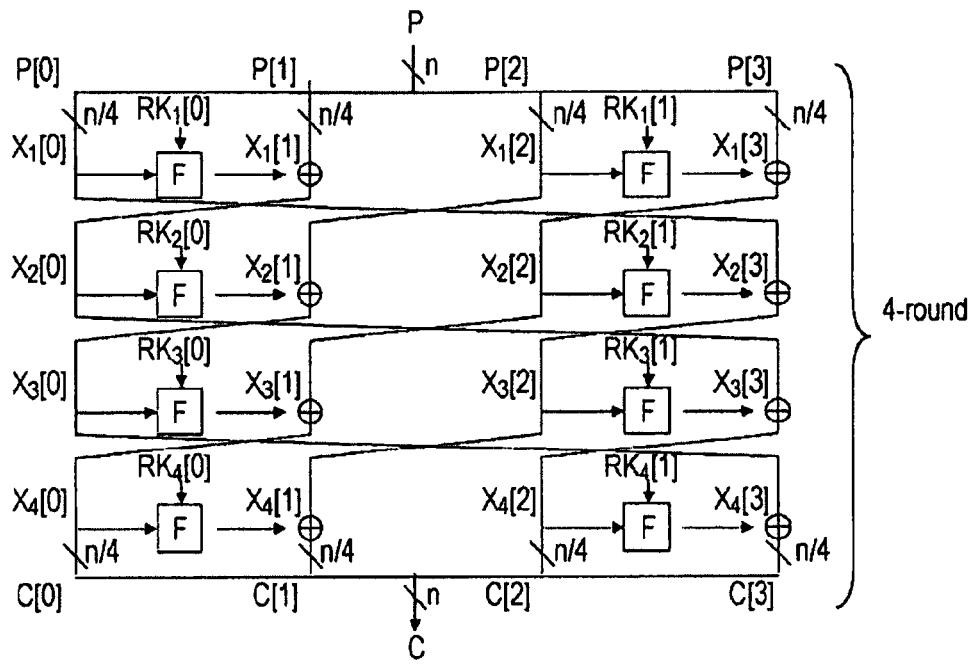
FIG. 16 is a diagram showing encryption and decryption functions of a four-stage GFN.
Figure 16:
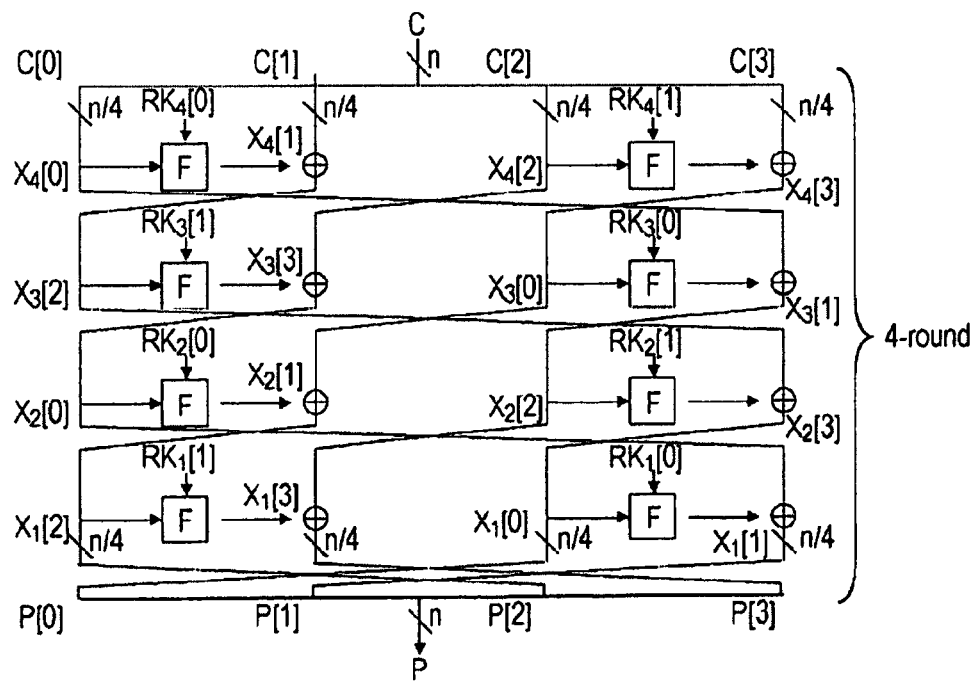

FIG. 16 shows encryption and decryption functions of a four-stage GFN as an example in which the number of stages is an even number. The encryption function of FIG. 16 (FIG. 16(a)) is processed as follows:

[(0-th stage)]

$X_1[0]=P[0]$ $X_1[1]=P[1]$ $X_1[2]=P[2]$ $X_1[3]=P[3]$

[first stage]

$X_2[0]=F(X_1[0],RK_1[0])(+)X_1[1]$ $X_2[1]=X_1[2]$ $X_2[2]=F(X_1[2],RK_1[1])(+)X_1[3]$ $X_2[3]=X_1[0]$

[second stage]

$X_3[0]=F(X_2[0],RK_2[0])(+)X_2[1]$ $X_3[1]=X_2[2]$ $X_3[2]=F(X_2[2],RK_2[2])(+)X_2[3]$ $X_3[3]=X_2[0]$

[third stage]

$X_4[0]=F(X_3[0],RK_3[0])(+)X_3[1]$ $X_4[1]=X_3[2]$ $X_4[2]=F(X_3[2],RK_3[1])(+)X_3[3]$ $X_4[3]=X_3[0]$

[fourth stage]

$C[0]=X_4[0]$ $C[1]=F(X_4[0],RK_4[0])(+)X_4[1]$ $C[2]=X_4[2]$ $C[3]=F(X_4[2],RK_4[1])(+)X_4[3]$

In addition, the decryption function of FIG. 16 (FIG. 16(*b*)) is processed as follows:

[first stage]

$X_4[0]=C[0]$ $X_4[1]=F(X_4[0],RK_4[0])(+)C[1]$ $X_4[2]=C[2]$ $X_4[3]=F(X_4[2],RK_4[1])(+)C[3]$

[second stage]

$X_3[0]=X_4[3]$ $X_3[1]=F(X_3[0],RK_3[0])(+)X_4[0]$ $X_3[2]=X_4[1]$ $X_3[3]=F(X_3[2],RK_3[1])(+)X_4[2]$

[third stage]

$X_2[0]=X_3[3]$ $X_2[1]=F(X_2[0],RK_2[0])(+)X_3[0]$ $X_2[2]=X_3[1]$ $X_2[3]=F(X_2[2],RK_2[1])(+)X_3[2]$

[fourth stage]

$X_1[0]=X_2[3]$ $X_1[1]=F(X_1[0],RK_1[0])(+)X_2[0]$ $X_1[2]=X_2[1]$ $X_1[3]=F(X_1[2],RK_1[1])(+)X_2[2]$

[final stage]

$P[0]=X_1[2]$ $P[1]=X_1[3]$ $P[2]=X_1[0]$ $P[3]=X_3[1]$

As can be apparently seen from the above equation, data encrypted using an encryption function can be decrypted using an encryption function in which the order of round keys is permuted and in which the left and right outputs of the final output are permuted. Note that in a case where the equations are generalized, the encryption function and the decryption function can be given as follows:

[*GFN* encryption function(in a case where the number of stages is an even number(*r*=even number))]

$X_1[0]=P[0]$ $X_1[1]=P[1]$ $X_1[2]=P[2]$ $X_1[3]=P[3]$ for $i=2$ to $r$ $X_i[0]=F(X_{i-1}[0],RK_{i-1}[0])(+)X_{i-1}[1]$ $X_i[1]=X_{i-1}[2]$ $X_i[2]=F(X_{i-1}[2],RK_{i-1}[2])(+)X_{i-1}[3]$ $X_i[3]=X_{i-1}[0]$ $C[0]=X_r[0]$ $C[1]=F(X_r[0],RK_r[0])(+)X_r[1]$ $C[2]=X_r[2]$ $C[3]=F(X_r[2],RK_r[1])(+)X_r[3]$

[*GFN* decryption function(in a case where the number of stages is an even number(*r*=even number))]

$Xr[0]=C[0]$ $Xr[1]=F(X_r[0],RK_r[0])(+)C[1]$ $Xr[2]=C[2]$ $Xr[3]=F(X_r[2],RK_r[1])(+)C[3]$ for $i=r-1$ downto $1$ $Xi[0]=X_{i+1}[3]$ $Xi[1]=F(X_i[0],RK_i[0])(+)X_{i+1}[0]$ $Xi[2]=X_{i+1}[1]$ $Xi[3]=F(X_i[2],RK_i[1])(+)X_{i+1}[2]$ $P[0]=X_1[2]$ $P[1]=X_1[3]$ $P[2]=X_1[0]$ $P[3]=X_1[1]$ (4-2) With Regard to Involution Properties Holding Structure in Extended Feistel Structure (GFN) Having Diffusion-Matrix Switching Mechanism (DSM)

Next, an involution properties holding structure in an extended Feistel structure (GFN) having a diffusion-matrix switching mechanism (DSM) will be explained.

Figure 17:
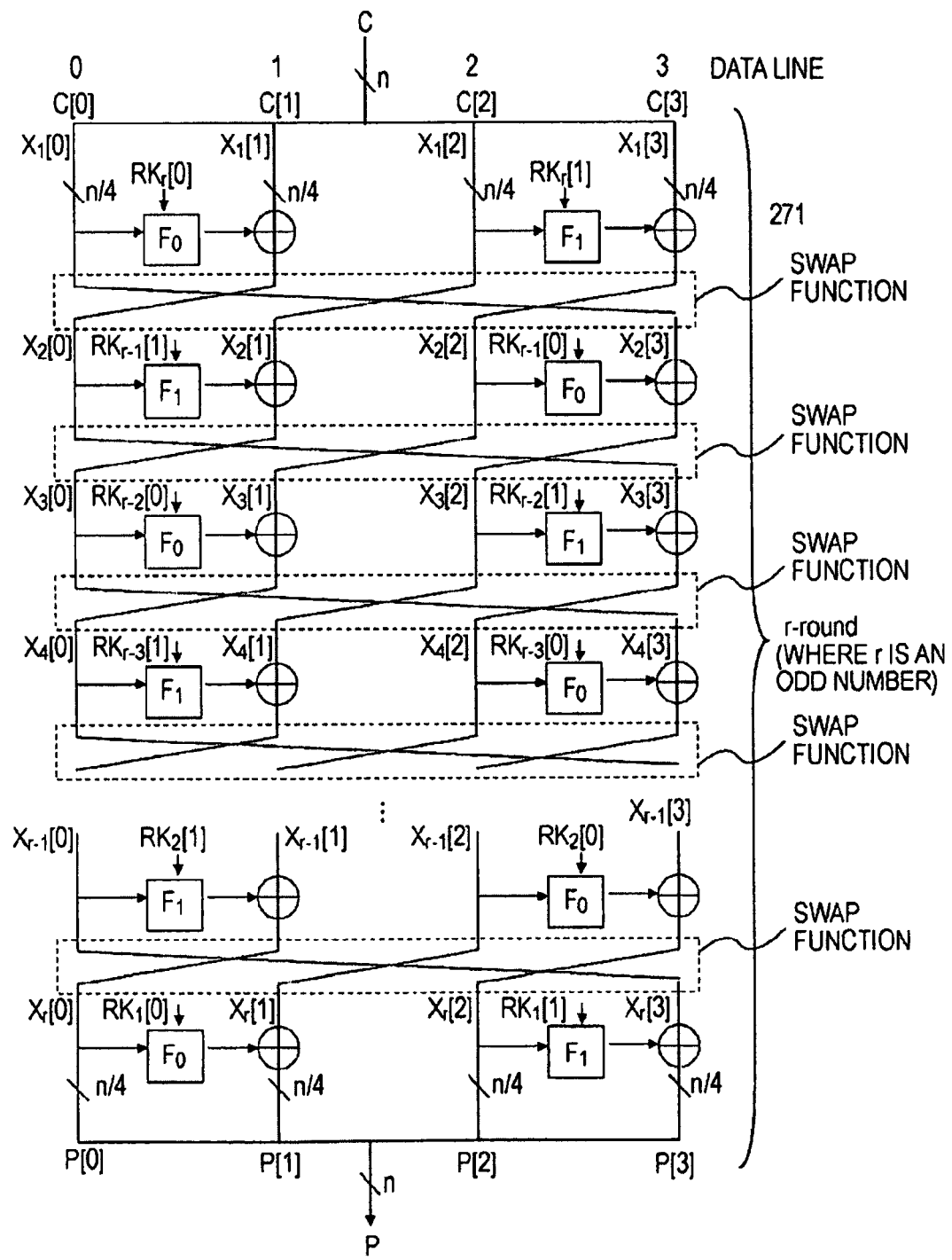
FIG. 17 is a diagram showing an example of a decryption processing configuration configured to allow involution properties to be held in an extended Feistel structure (GFN) having a diffusion-matrix switching mechanism (DSM).

FIG. 17 shows an example of a decryption processing configuration configured to allow involution properties to be held in an extended Feistel structure (GFN) having a diffusion-matrix switching mechanism (DSM).

The decryption processing configuration shown in FIG. 17 is an example configuration of a decryption function corresponding to the example configuration of the encryption function of the extended Feistel structure (GFN) having a diffusion-matrix switching mechanism (DSM), which has been explained earlier with reference to FIG. 10, in which the number of data lines (the number of divisions) d is set to d=4. That is, a configuration that executes decryption processing that can be applied to decryption of ciphertext generated in the cryptographic processing configuration having a diffusion-matrix switching mechanism (DSM) explained with reference to FIG. 10 is shown. Note that the decryption processing configuration shown in FIG. 17 corresponds to a decryption function that can be executed by applying hardware or software. As described previously, an encryption function and a decryption function are configured to hold involution properties in which a common function can be applied, whereby the advantage of reducing implementation cost, reducing the size of the apparatus, etc., can be achieved.

In the decryption processing configuration shown in FIG. 11 explained earlier as a decryption processing configuration corresponding to the cryptographic processing configuration shown in FIG. 10, due to the different swap functions being applied, a cipher function and a decryption function have different configurations and cannot hold the involution properties. In the decryption processing configuration shown in FIG. 17, however, a configuration is provided in which a swapping process is performed in the same style as that of the swap function applied in the cryptographic processing configuration shown in FIG. 10. That is, a configuration is obtained in which swap functions applied in both encryption processing and decryption processing are set as a common function. That is, the encryption function (FIG. 10) and the decryption function (FIG. 17) realize a configuration that holds involution properties in which a common function can be applied.

However, the decryption processing configuration shown in FIG. 17 is a decryption processing configuration in a case where the number of rounds r is an odd number. A decryption processing configuration that holds the involution properties, which corresponds to the encryption function (FIG. 10) in a case where the number of rounds r is an even number, has a configuration shown in FIG. 18.

First, the configuration of the decryption function shown in FIG. 17, which is a decryption processing configuration in a case where the number of rounds r is an odd number, will be explained. In the decryption processing configuration of FIG. 17, the input is ciphertext C. The ciphertext C is divided into four data lines C[0], C[1], C[2], and C[3] (the number of divisions=4), and data transformation to which F-functions $F_0$ and $F_1$ are applied is sequentially executed in the respective rounds to output P[0], P[1], P[2], and P[3], which constitute plaintext P, as results of the transformation for r rounds. In the F-functions $F_0$ and $F_1$ for each round, round keys (sub-keys) $RK_i[0]$ and $RK_i[1]$ serving as elements constituting an expanded key generated on the basis of a master key (main key) supplied from a key scheduling section, which is not shown in the figure, are input and applied to data transformation.

In the decryption function shown in FIG. 17, the order of the applied keys in the respective rounds is opposite to that of the applied keys in the respective rounds of the encryption function shown in FIG. 10. This implies a relationship similar to the correspondence between the encryption function of FIG. 10 and the decryption function of FIG. 11.

In the decryption function in FIG. 17, however, a swapping process executed as a process of permuting the respective data lines in portions where the rounds are switched is a swapping process which is the same as the swapping process shown in FIG. 10. As shown in FIG. 17, a swap function 271 is applied to outputs of the respective data lines at the time of switching between the respective rounds to set the lines to be input in a next round, which correspond to the outputs of the respective data lines.

In FIG. 17, for example, when data lines are represented by, as shown in the upper stage of FIG. 17, data lines 0, 1, 2, and 3 from the left, the permutation of the outputs of the four lines in a preceding round and the lines to be input for the subsequent round is switched using the swap function 271 as follows:

The output of the data line 0 in the preceding round is set as the input of the data line 3 in the subsequent round.

The output of the data line 1 in the preceding round is set as the input of the data line 0 in the subsequent round.

The output of the data line 2 in the preceding round is set as the input of the data line 1 in the subsequent round.

The output of the data line 3 in the preceding round is set as the input of the data line 2 in the subsequent round.

A function that executes such a line permutation process is the swap function 271.

This swapping process is a line permutation process which is the same as that of the swap function 211 in the encryption processing explained earlier with reference to FIG. 10.

Therefore, completely the same swap function can be applied in both the encryption processing shown in FIG. 10 and the decryption processing shown in FIG. 17.

In the decryption processing configuration shown in FIG. 17, in order to allow the swap function to have the same configuration as that of the encryption processing, it is devised to permute F-functions $F_0$ and $F_1$ in the respective even-numbered rounds and to permute input keys (round keys).

Within the decryption processing configuration shown in FIG. 17, in even-numbered rounds indicated by double circles in the figure, the F-functions $F_0$ and $F_1$ are permuted and the input keys (round keys) are permuted. As shown in the figure, in the second round, which is a round located two rounds from the top in the decryption processing configuration shown in FIG. 17, a configuration is provided in which the F-function $F_1$ is set on the left side and the F-function $F_0$ is set on the right side and further in which a round key $RK_{(r-1)}[1]$ is input to the left-hand-side F-function $F_1$ and a round key $RK_{(r-1)}[0]$ is input to the right-hand-side F-function $F_0$. Subsequently, in the respective even-numbered rounds, namely, in the fourth round, the sixth round . . . , permutation of the respective F-functions and round keys input to the F-functions is performed. This distinction is notable when compared with FIG. 11. In FIG. 11, for all rounds, the left-hand-side F-functions are $F_0$ and are set to receive inputs of the round key $RK_i[0]$, and the right-hand-side F-functions are $F_1$ and receive inputs of the round key $RK_i[1]$.

In the case of the configuration described above, however, the encryption processing configuration explained with reference to FIG. 10 and the decryption processing configuration shown in FIG. 17 have different arrangements of F-functions. Thus, it is difficult to say that a configuration that realizes the sharing of an encryption function and a decryption function is provided. That is, the permutation of F-functions for the even-numbered stages occurs only in the decryption processing, and it may not be said that the same function as the cipher function is realized.

The encryption function and the decryption function may be configured such that F-function parts are given as different functions from outside. This technique, however, leads to a reduction in execution speed, like a technique of giving a swap function from outside, which may not be said to be a preferred technique. It is therefore configured such that input and output results of the F-functions are implemented by table look-up (table).

That is, in the case of the configuration shown in FIG. 17, a configuration is provided in which two different F-functions, namely, the F-functions $F_0$ and $F_1$, are applied, and output values corresponding to input values of those respective F-functions are prepared in advance as a table and are stored in a memory of the cryptographic processing apparatus. The tables for the respective F-functions are configured to be acquirable on the basis of respective addresses indicating the table storage positions in the memory.

In this manner, the output values of the respective F-functions $F_0$ and $F_1$ are configured to be acquirable from a table stored in the memory, and in the portions where the F-functions are executed in the even-numbered stages in the decryption processing configuration shown in FIG. 17, a configuration is provided in which addresses of respective tables are given to the decryption function from outside to acquire tables to obtain outputs of the respective F-functions. That is, at least the portions where the F-functions are executed in the even-numbered stages are configured to execute processes in accordance with addresses for acquiring tables in the cipher function and the decryption function.

In general, in the case of a processing configuration executed by software, the inside of the F-functions is implemented by table look-up (table). The term table look-up (table) implementation is an implementation technique that involves, instead of performing actual operations, holding only pre-computed operation results in a memory space in the form of a table (permutation table) and referring to them at a desired time to obtain a desired output value. For example, in a case where a computation such as $$f(x)=x^3$$

is to be performed, with the provision of a table (permutation table), named ftab, having the values below, the result of $x^3$ can be obtained by referring to the contents of ftab without performing the actual computation of $x^3$:

$ftab[0]=0(=0^3)$, $ftab[1]=1(=1^3)$, $ftab[2]=8(=2^3)$, $ftab[3]=27(=3^3)$, $ftab[4]=64(=4^3)$

. . . ,

The above is an example of the table ftab having a configuration in which when 0, 1, 2, 3, and 4 are present as input values, 0, 1, 8, 27, and 64 are acquired as outputs.

In this manner, an F-function applies a table look-up (table) implementation configuration. Output values corresponding to input values of each required F-function are prepared in advance as a table and are stored in a memory of a cryptographic processing apparatus. Tables for respective F-functions are configured to be acquirable on the basis of respective addresses indicating the table storage positions in the memory. According to this method, it is possible to easily permute F functions without reducing the execution speed. As an applied use of this, only the addresses of the tables for the F-functions at the even-numbered stages are given from outside, whereby an encryption function and a decryption function can be modified without using functions.

That is, in GFN using DSM, in order to share an encryption function and a decryption function, the following configurations are employed:

(1) Like a standard Feistel type cipher, the order of an expanded key is permuted every stage.

(2) Like a standard GFN structure, the position of an expanded key is permuted for every F-function in an even-numbered stage.

(3) Addresses of tables of F-functions for the even-numbered stages are permuted in both the encryption function and the decryption function.

The foregoing method enables an encryption function and a decryption function to be shared while minimizing the reduction of the execution speed.

As described above, in the decryption processing configuration shown in FIG. 17, as a configuration in which input round keys on respective even-numbered rounds are permuted to acquire the processing results of respective F-functions for the even-numbered rounds from tables, a process to which an address of a table corresponding to each F-function is applied is executed, whereby the same swap function as the swap function applied in the cryptographic processing configuration shown in FIG. 10 can be applied and involution properties in which a common function can be used for an encryption function and a decryption function can be realized.

The decryption processing configuration shown in FIG. 17 is a decryption processing configuration in a case where the number of rounds r is an odd number. A decryption processing configuration that holds the involution properties corresponding to the encryption function (FIG. 10) in a case where the number of rounds r is an even number has a configuration shown in FIG. 18.

Figure 18:
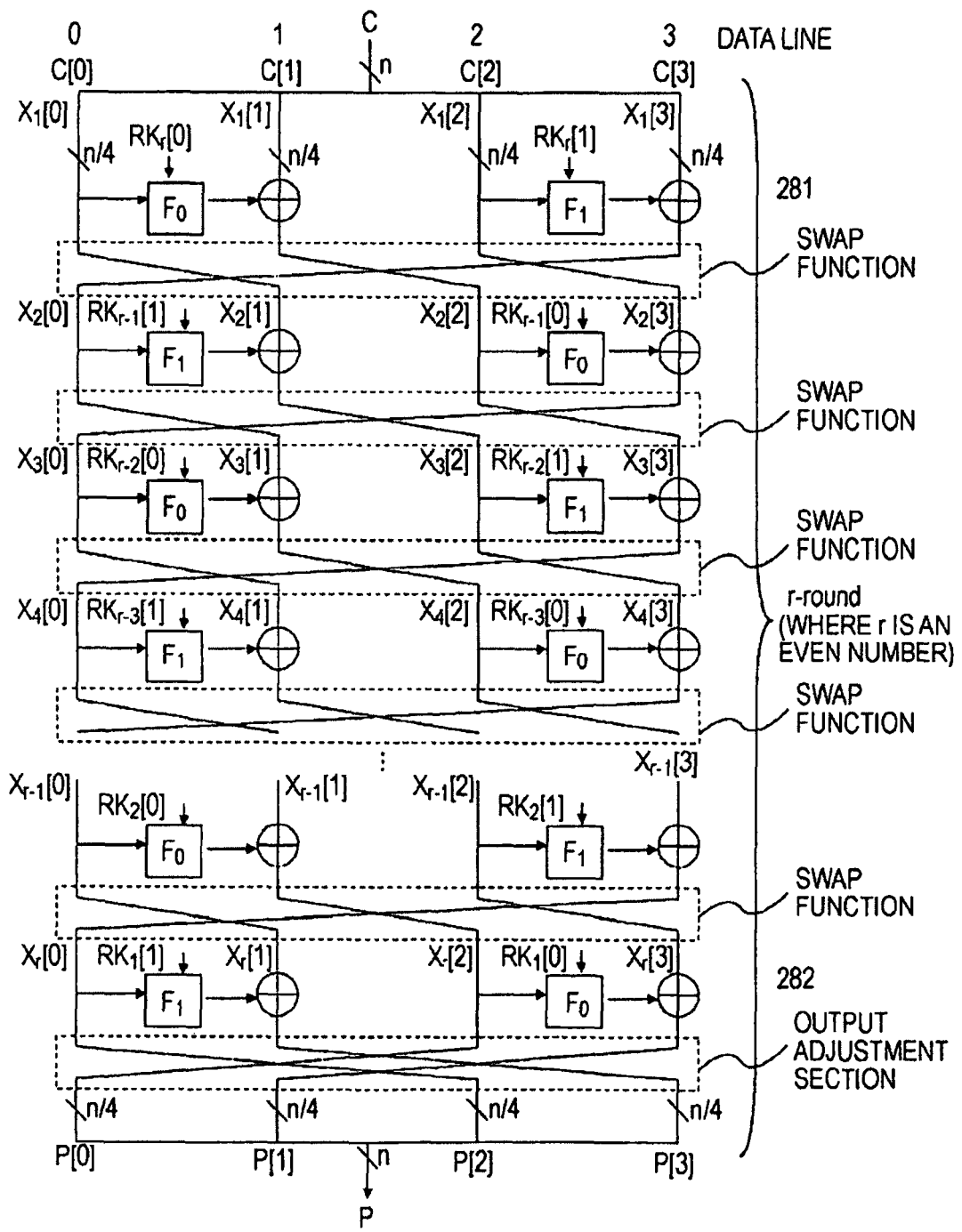
FIG. 18 is a diagram showing an example of a decryption processing configuration configured to allow involution properties to be held in an extended Feistel structure (GFN) having a diffusion-matrix switching mechanism (DSM).

The decryption processing configuration shown in FIG. 18 also represents a decryption processing configuration corresponding to a decryption function applied to the decryption processing of returning ciphertext encrypted using the cryptographic processing configuration shown in FIG. 10 into plaintext. In the configuration of FIG. 18, the number of rounds r is an odd number.

Like the decryption processing configuration shown in FIG. 17, the decryption processing configuration shown in FIG. 18 is also a configuration in which the permutation of F-functions $F_0$ and $F_1$ set in respective even-numbered rounds, which are indicated by double circles in the figure, and round keys input to the respective F-functions is executed. Further, a configuration is obtained in which an, output adjustment process is executed for the processing results on the final round. An output adjustment section 282 is executed as a process for obtaining the final output, namely, P[0], P[1], P[2], and P[3], by permuting the values of the respective data lines in the final round. It is only required to execute this part only once as a process to be performed after the execution of the decryption function, which does not cause significant reduction in efficiency.

Like the configuration shown in FIG. 17, a swap function 281 in the configuration shown in FIG. 18 has a configuration that performs the same swapping process as that of the swap function 211 in the encryption processing configuration explained with reference to FIG. 10. That is:

The output of the data line 0 in the preceding round is set as the input of the data line 3 in the subsequent round.

The output of the data line 1 in the preceding round is set as the input of the data line 0 in the subsequent round.

The output of the data line 2 in the preceding round is set as the input of the data line 1 in the subsequent round.

The output of the data line 3 in the preceding round is set as the input of the data line 2 in the subsequent round.

A function that executes such a line permutation process is the swap function 281.

This swapping process is the same line permutation process as that of the swap function 211 in the encryption processing explained earlier with reference to FIG. 10.

Therefore, completely the same swap function can be applied in both the encryption processing shown in FIG. 10 and the decryption processing shown in FIG. 18.

In the decryption processing configuration shown in FIG. 18, in order to allow the swap function to have the same configuration as that of the encryption processing, it is devised to modify the input style of F-functions and input keys (round keys) in each round. It is further devised to provide a configuration in which an output adjustment process is executed for the processing results on the final round using the output adjustment section 282.

Note that the permutation of the F-functions in the respective even-numbered stages is performed by providing a configuration in which, like the example configuration explained earlier with reference to FIG. 17, a correspondence table of input/output data of each F-function is stored in a memory in advance and in which tables corresponding to respective F-functions are acquired using addresses for acquiring tables corresponding to respective F-functions to acquire the processing results of the F-functions. Thus, the common use of an encryption function and a decryption function can be realized.

The setting described above enables the same swap function as a swap function applied in the cryptographic processing configuration shown in FIG. 10 to be applied, and involution properties in which a common function can be applied to an encryption function and a decryption function are realized.

[5. Example Configuration of Cryptographic Processing Apparatus]

Figure 19:
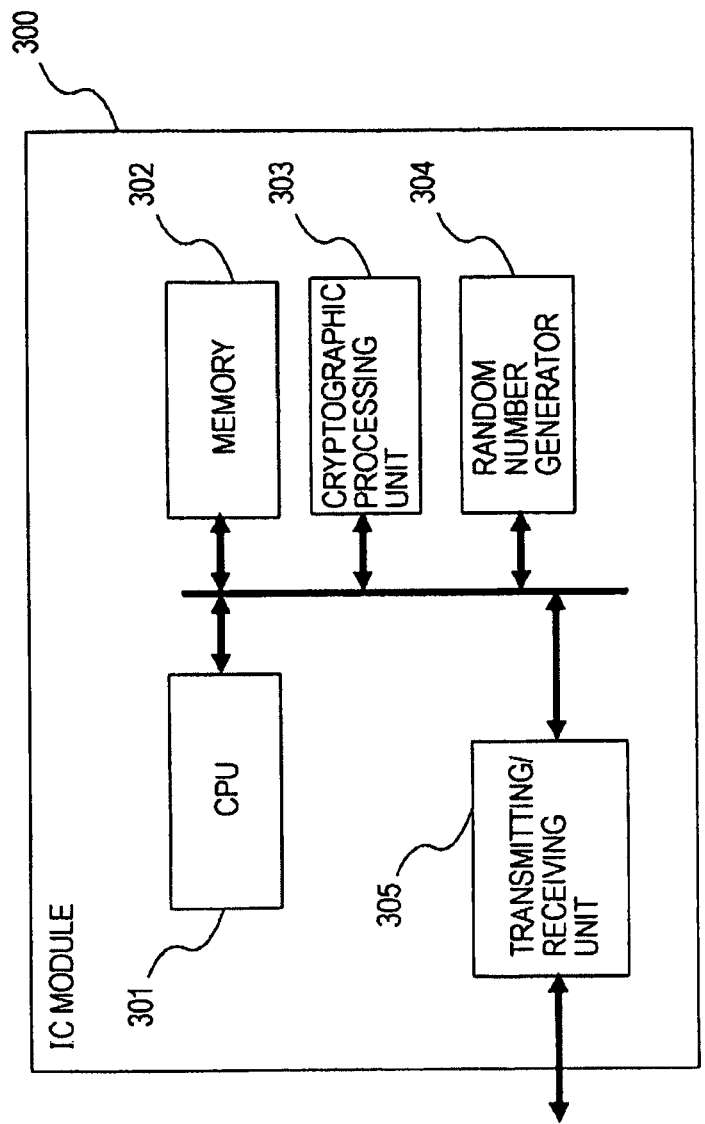
FIG. 19 is a diagram showing an example configuration of an IC module serving as a cryptographic processing apparatus that executes cryptographic processing according to the present invention.

Finally, FIG. 19 shows an example configuration of an IC module 300 serving as a cryptographic processing apparatus that executes the cryptographic processing according to the exemplary embodiment described above. The processing described above can be executed in, for example, PCs, IC cards, readers/writers, or various other information processing apparatuses. The IC module 300 shown in FIG. 19 can be configured within such various devices.

A CPU (Central processing Unit) 301 shown in FIG. 19 is a processor that executes control of start or end of cryptographic processing and transmission and reception of data, and control of data transfer between constituent units, and various other programs. A memory 302 includes a ROM (Read-Only-Memory) that stores a program executed by the CPU 301 or fixed data such as operation parameters, a RAM (Random Access Memory) used as a storage area or work area for a program executed in the processing of the CPU 301 and parameters that appropriately change in the program processing, and so forth. The memory 302 can also be used as a storage area for key data necessary for cryptographic processing, a transformation table (permutation table) applied in cryptographic processing, data applied to transformation matrices, etc. Note that the data storage area is preferably configured as a memory having a tamper-resistant structure.

A cryptographic processing unit 303 executes cryptographic processing and decryption processing according to, for example, the extended Feistel type common key block cipher processing algorithm described above. Note that, here, cryptographic processing means is shown as a separate module by way of example. However, it may be configured such that instead of providing such an independent cryptographic processing module, for example, a cryptographic processing program is stored in the ROM so that the CPU 301 reads and executes the program stored in the ROM.

A random number generator 304 executes a process of generating random numbers necessary for the generation of keys necessary for cryptographic processing or the like.

A transmitting/receiving unit 305 is a data communication processing unit that executes data communication with outside. For example, the transmitting/receiving unit 303 executes data communication with an IC module such as a reader/writer, and executes the output of ciphertext generated in the IC module, the input of data from an external device such as a reader/writer, etc.

The cryptographic processing unit 303 of the IC module 300 functions as a data processing unit that executes, for example, in accordance with the exemplary embodiment described above, extended Feistel type cryptographic processing in which the number of data lines d is an integer satisfying d≥3. The cryptographic processing unit 303 executes data processing including a common swapping process which is common to encryption processing and decryption processing. For example, the cryptographic processing unit 303 modifies applied round keys in the encryption processing and the decryption processing to thereby execute data processing including the common swapping process in both the encryption processing and the decryption processing. That is, a common function including a swap function which is common to the encryption processing and the decryption processing is executed.

In the case of executing cryptographic processing in which transformation matrices of linear transformation processes executed in F-functions for respective rounds constituting an extended Feistel structure are set to a common matrix, as explained earlier with reference to FIGS. 13 and 14, the cryptographic processing unit 303 performs a round key permutation process in which an applied sequence for round keys applied in respective rounds of the decryption processing is set to a sequence opposite to that of the cryptographic processing and in which round keys input to a plurality of F-functions for each of even-numbered rounds are further set to have an input style different from that in the encryption processing.

Further, in the case of executing cryptographic processing in accordance with a Feistel structure having a diffusion-matrix switching mechanism (DSM: Diffusion Switching Mechanism) in which transformation matrices applied to linear transformation processes in F-functions for respective rounds constituting an extended Feistel structure are configured by selectively applying at least two or more different matrices, as explained earlier with reference to FIGS. 17 and 18, the cryptographic processing unit 303 performs an F-function and round key permutation process in which an applied sequence for round keys applied in respective rounds of the decryption processing is set to a sequence opposite to that of the cryptographic processing and in which a plurality of F-functions in each of even-numbered rounds and round keys input to the plurality of F-functions are further set to have an input style different from that in the encryption processing. In the case of this process, a process of invoking a table storing input/output correspondence data corresponding to each of a plurality of different F-functions from a memory in accordance with an address designated in correspondence with each round to calculate processing results of the respective F-functions is executed.

Further, in a case where the number of rounds constituting an extended Feistel structure is an even number, as explained earlier with dereference to FIGS. 14 and 18, the cryptographic processing unit 303 executes output adjustment to perform a sequence permutation process on the output results on a final round of the decryption processing.

The present invention has been described in detail with reference to a specific exemplary embodiment. However, it is obvious that a person skilled in the art could make modifications or alternatives to the exemplary embodiment without departing from the scope of the present invention. That is, the present invention has been disclosed in a form of illustration, and should not be restrictively construed. References should be made to the section of CLAIMS for determining the scope of the present invention.

The series of processes explained herein can be executed by hardware or software, or a combination configuration of both. In a case where the processes are executed by software, a program recording the processing sequence can be installed into a memory in a computer incorporated in dedicated hardware and executed. Alternatively, the program can be installed into a general-purpose computer capable of executing various processes and executed.

For example, the program can be recorded in advance on a hard disk or ROM (Read Only Memory) serving as a recording medium. Alternatively, the program can be stored (recorded) temporarily or permanently on a removable recording medium such as a flexible disc, a CD-ROM (Compact Disc Read Only Memory), an MO (Magneto optical) disc, a DVD (Digital Versatile Disc), a magnetic disc, or a semiconductor memory. Such removable recording media can be provided as so-called packaged software.

Note that the program can be installed from a removable recording medium as described above into a computer and can also be transferred wirelessly from a download site to a computer, or transferred by wire to a computer via a network such as a LAN (Local Area Network) or the Internet, and the computer can receive the program transferred in such a manner and install it into a built-in recording medium such as a hard disk.

Note that various processes described herein may be executed sequentially in the order described, or may also be executed in parallel or individually, according to the processing capabilities of an apparatus that executes the processes or necessity. In addition, as used in the description the term system refers to a configuration of a logical set of a plurality of apparatuses, and is not limited to one whose constituent apparatuses are housed in a single housing.

INDUSTRIAL APPLICABILITY

As described above, according to a configuration of an exemplary embodiment of the present invention, a cryptographic processing configuration to which an extended Feistel structure in which the number of data lines d is set to an integer satisfying d≥3 can be configured such that involution properties, that is, the application of a function which is common to encryption processing and decryption processing, can be achieved. Specifically, with a configuration that provides permutation of round keys or permutation of F-functions in decryption processing, processing using a common function can be performed by setting swap functions for encryption processing and decryption processing to have the same processing style. With the present configuration, a reduction in the cost or size of the apparatus is realized.

The invention claimed is:
1. A cryptographic processing apparatus, the cryptographic processing apparatus comprising a data processing unit configured to:
modify round keys applied in encryption and decryption processing to execute swapping processes during the encryption and decryption processing;
execute cryptographic processing; and
perform a round key permutation process in which (i) a sequence of round keys applied in corresponding rounds of the decryption processing is set opposite to a sequence applied during the cryptographic processing, and (ii) round keys input to a plurality of F-functions for even-numbered rounds have an input style different from an input style of the encryption processing.

2. The apparatus of claim 1, wherein:
the cryptographic processing is executed in accordance with an extended Feistel structure;
the extended Feistel structure includes a number of data lines d; and
the number of data lines d is an integer satisfying d≥3.

3. The apparatus of claim 2, wherein when a number of rounds is an even number, the data processing unit is configured to perform a sequence permutation process on results output from a final round of the decryption processing.

4. The apparatus of claim 1, wherein the data processing unit is further configured to:
execute the cryptographic processing in accordance with a Feistel structure having a diffusion-matrix switching mechanism in which transformation matrices are configured by a selective application of two or more different matrices; and
perform an F-function and round key permutation process in which (a) a sequence of round keys applied in respective rounds of the decryption processing is set opposite to a sequence applied during the cryptographic processing, and (b) a plurality of F-functions in corresponding even-numbered rounds and round keys input to the plurality of F-functions have an input style different from an input style of the encryption processing.

5. The apparatus of claim 4, wherein the data processing unit is further configured to:
obtain input/output correspondence data corresponding to each of a plurality of different F-functions; and
calculate processing results of the F-functions, based on corresponding portions of the input/output correspondence data.

6. The apparatus of claim 5, wherein:
the apparatus further comprises a memory configured to store the input/output correspondence data; and
the data processing unit is further configured to obtain the input/output correspondence data in accordance with an address corresponding to each of the rounds.

7. The apparatus of claim 3, wherein the transformation matrices correspond to a common matrix.

8. The apparatus of claim 1, wherein:
the data processing unit is further configured to execute swap functions during encryption and decryption processing; and
the swap function executed during encryption processing corresponds to the swap function executed during decryption processing.

9. A computer-implemented method, comprising:
modifying round keys applied in encryption and decryption processing to execute swapping processes during the encryption and decryption processing;
executing cryptographic processing using at least one processor; and
performing a round key permutation process in which (i) a sequence of round keys applied in corresponding rounds of the decryption processing is set opposite to a sequence applied during the cryptographic processing, and (ii) round keys input to a plurality of F-functions for even-numbered rounds have an input style different from an input style of the encryption processing.

10. The method of claim 9, wherein:
the executing comprises executing the cryptographic processing in accordance with an extended Feistel structure;
the extended Feistel structure includes a number of data lines d; and
the number of data lines d is an integer satisfying d≥3.

11. The method of claim 10, wherein when a number of rounds is an even number, the method further comprises performing a sequence permutation process on results output from a final round of the decryption processing.

12. The method of claim 9, wherein:
the executing further comprises executing the cryptographic processing in accordance with a Feistel structure having a diffusion-matrix switching mechanism in which transformation matrices are configured by selectively applying at least two or more different matrices; and
the performing further comprises performing an F-function and round key permutation process in which (a) a sequence of round keys applied in respective rounds of the decryption processing is set opposite to a sequence applied during the cryptographic processing, and (b) a plurality of F-functions in corresponding even-numbered rounds and round keys input to the plurality of F-functions have an input style different from an input style of the encryption processing.

13. The method of claim 12, further comprising:
obtaining input/output correspondence data corresponding to each of a plurality of different F-functions; and
calculating processing results of the F-functions, based on corresponding portions of the input/output correspondence data.

14. The method of claim 13, wherein:
the apparatus further comprises a memory configured to store the input/output correspondence data; and
the obtaining comprises obtaining the input/output correspondence data in accordance with an address corresponding to each of the rounds.

15. The method of claim 12, wherein the transformation matrices correspond to a common matrix.

16. The method of claim 9, further comprising executing swap functions during encryption and decryption processing, wherein the swap function executed during encryption processing corresponds to the swap function executed during decryption processing.

17. A tangible, non-transitory computer-readable medium storing instructions that, when executed by at least one processor, cause the at least one processor to perform a method, comprising:
modifying round keys applied in encryption and decryption processing to execute swapping processes during the encryption and decryption processing;
executing cryptographic processing using at least one processor; and
performing a round key permutation process in which (i) a sequence of round keys applied in corresponding rounds of the decryption processing is set opposite to a sequence applied during the cryptographic processing, and (ii) round keys input to a plurality of F-functions for even-numbered rounds have an input style different from an input style of the encryption processing.

18. The computer-readable medium of claim 17, wherein:
the executing comprises executing the cryptographic processing in accordance with an extended Feistel structure;
the extended Feistel structure includes a number of data lines d; and
the number of data lines d is an integer satisfying d≥3.

19. The computer-readable medium of claim 17, wherein:
the executing further comprises executing the cryptographic processing in accordance with a Feistel structure having a diffusion-matrix switching mechanism in which transformation matrices are configured by selectively applying at least two or more different matrices; and
the performing further comprises performing an F-function and round key permutation process in which (a) a sequence of round keys applied in respective rounds of the decryption processing is set opposite to a sequence applied during the cryptographic processing, and (b) a plurality of F-functions in corresponding even-numbered rounds and round keys input to the plurality of F-functions have an input style different from an input style of the encryption processing.

20. The computer-readable medium of claim 17, wherein the method further comprises:
obtaining input/output correspondence data corresponding to each of a plurality of different F-functions; and
calculating processing results of the F-functions, based on corresponding portions of the input/output correspondence data.

* * * * *